United States Patent
Sugawara

(10) Patent No.: US 11,025,787 B2
(45) Date of Patent: Jun. 1, 2021

(54) DATA TRANSMISSION APPARATUS AND CONTROL METHOD FOR USING DATA TRANSMISSION FUNCTIONS

(71) Applicant: CANON KABUSHIKI KAISHA, Tokyo (JP)

(72) Inventor: Kazuhiro Sugawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/595,968

(22) Filed: Oct. 8, 2019

(65) Prior Publication Data

US 2020/0128141 A1  Apr. 23, 2020

(30) Foreign Application Priority Data

Oct. 19, 2018  (JP) .............................. JP2018-197203

(51) Int. Cl.
  *H04N 1/00*  (2006.01)
  *H04N 1/44*  (2006.01)

(52) U.S. Cl.
  CPC ..... *H04N 1/00212* (2013.01); *H04N 1/00214* (2013.01); *H04N 1/4413* (2013.01); *H04N 1/4433* (2013.01)

(58) Field of Classification Search
  None
  See application file for complete search history.

(56) References Cited

U.S. PATENT DOCUMENTS

2013/0235413 A1*  9/2013  Terao .................... G06F 21/608
                                                          358/1.14
2018/0373478 A1*  12/2018  Miyaji .................. G06F 3/1222

FOREIGN PATENT DOCUMENTS

JP         2016-115974 A      6/2016

* cited by examiner

*Primary Examiner* — Lennin R Rodriguezgonzalez
(74) *Attorney, Agent, or Firm* — Canon U.S.A., Inc., IP Division

(57) ABSTRACT

In a data transmission apparatus, when user information for a user of an external mobile terminal coincides with user information managed by the data transmission apparatus, data transmission is readily performed based on transmission settings received from the mobile terminal. This gives rise to an issue that security cannot be ensured although the use of data transmission is limited. The data transmission apparatus uses a user authentication function to set not to transmit data transmitted from the external mobile terminal. With such a configuration, data transmission can be prevented when a limitation is made on data transmission processing by using user authentication.

9 Claims, 20 Drawing Sheets

FIG.6C

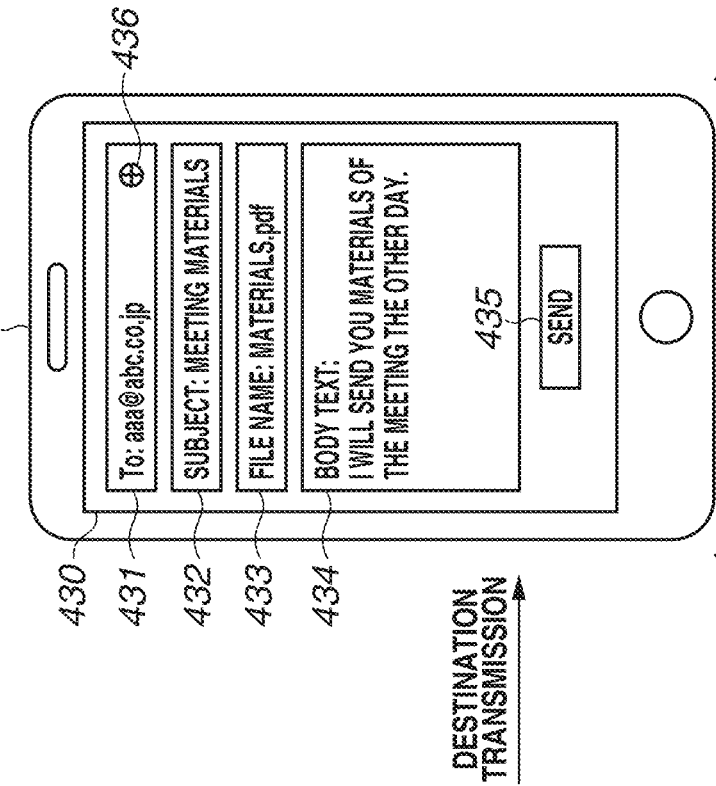
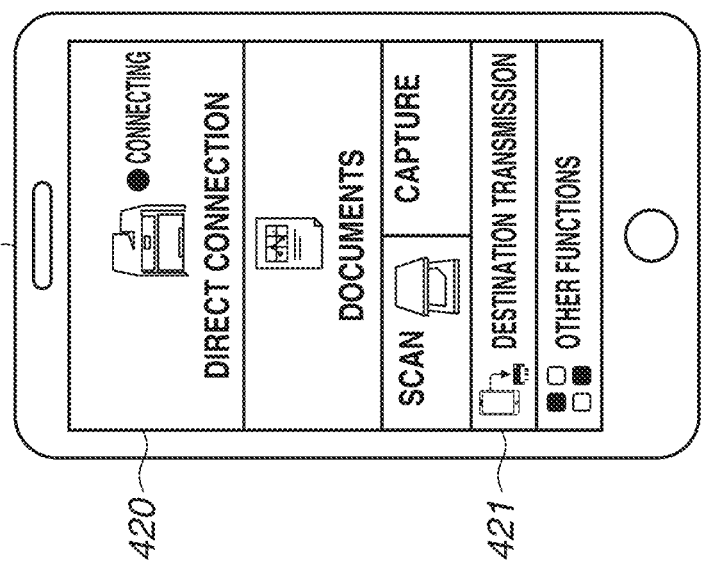

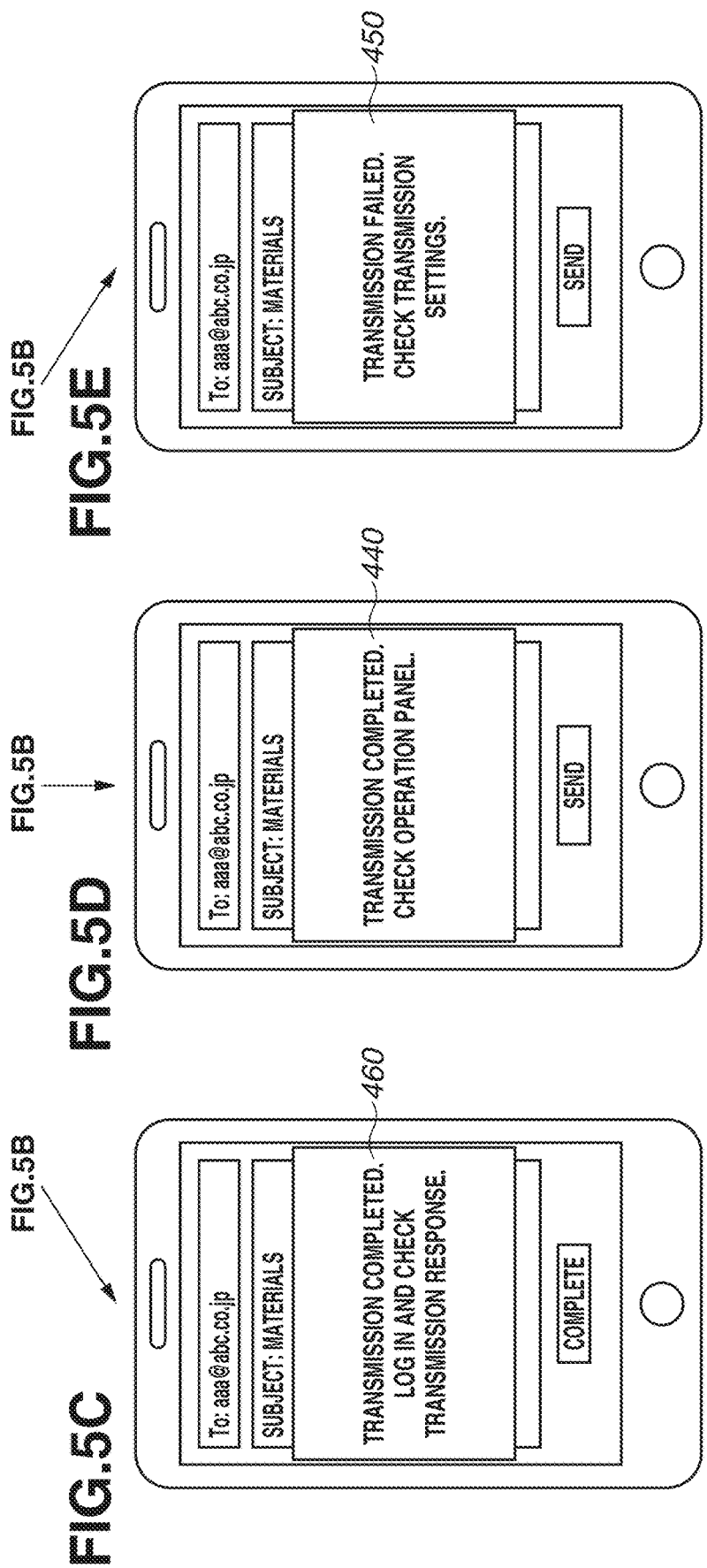

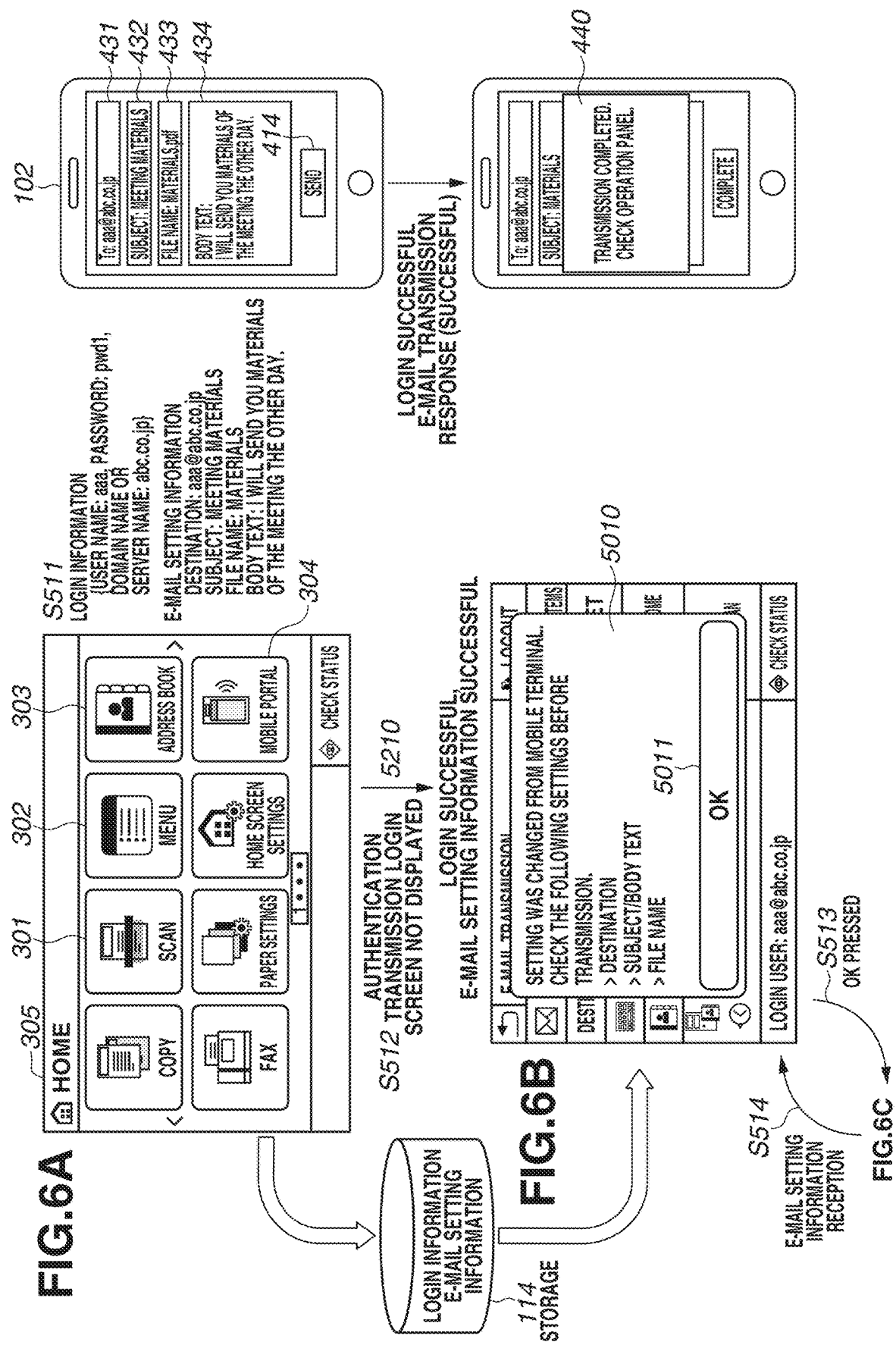

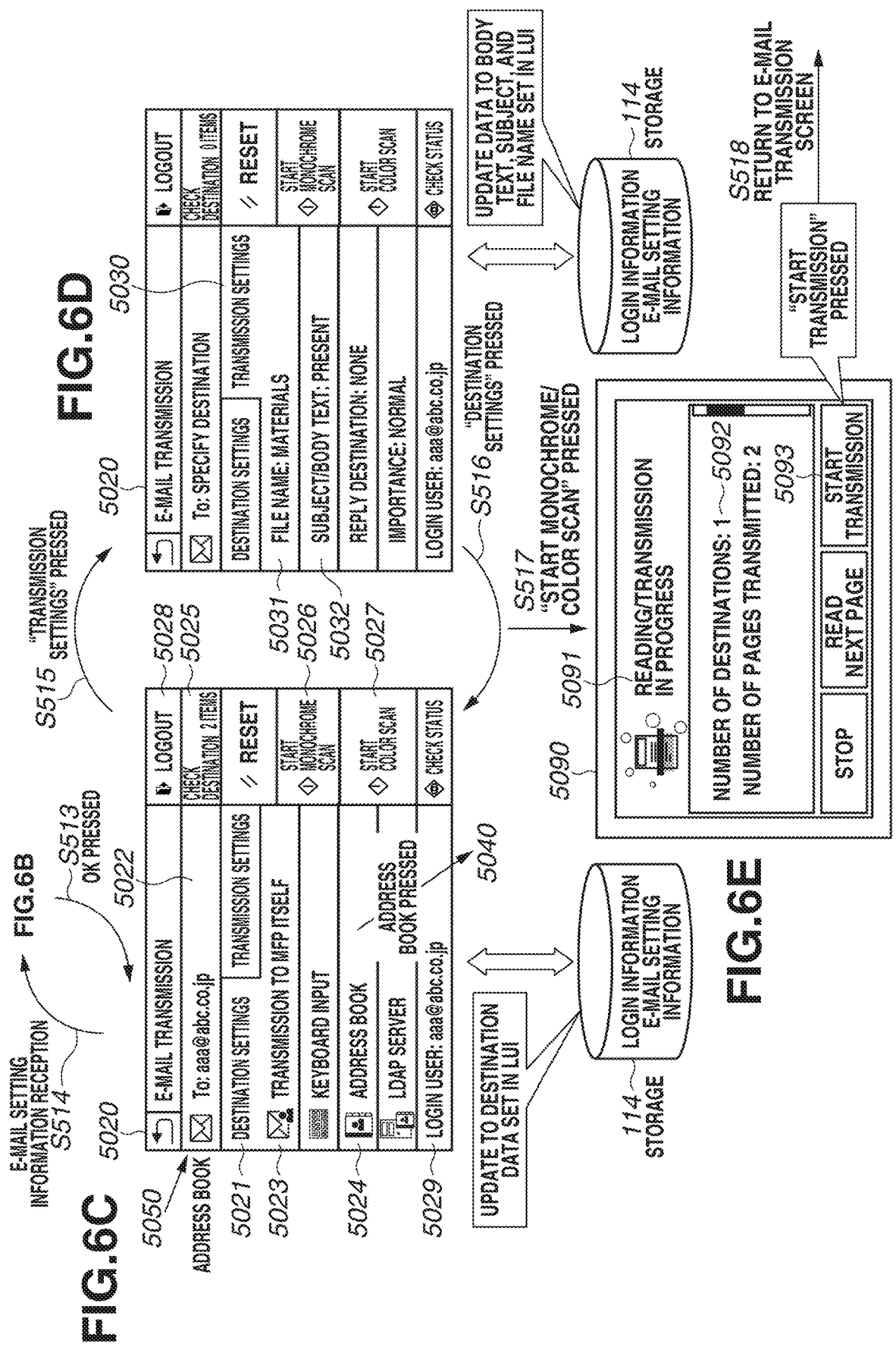

| DESTINATION DETAILS/EDITING | LOGOUT |

✓ ✉ ★ To: AAA aaa@abc.co.jp
*5081* ✓ ✉ ★ Cc: BBB bbb@abc.co.jp

S523 CHECK DESTINATION

| DESELECT FROM DESTINATION | EDIT DESTINATION | DETAILED INFORMATION | To/Cc/Bcc |

FILE NAME (24 CHARACTERS OR LESS) | LOGOUT

MATERIALS ⌫ < > q w e r t y u i o p -
a s d f g h j k l
@ z x c v b n m , . /
⇧ KANA/KANJI a 1/# SPACE

APPLY

*5071* *5072* *5073* *5054*

S524 FILE NAME

FIG.7E

| | 5060 | |
|---|---|---|
| ↶ | SUBJECT/BODY TEXT | ⬚ LOGOUT |

5061 — SUBJECT: MEETING MATERIALS
5062 — BODY TEXT: I WILL SEND YOU MATERIALS OF THE MEETING THE OTHER DAY.

← S525 SUBJECT/ BODY TEXT

APPLY
5054

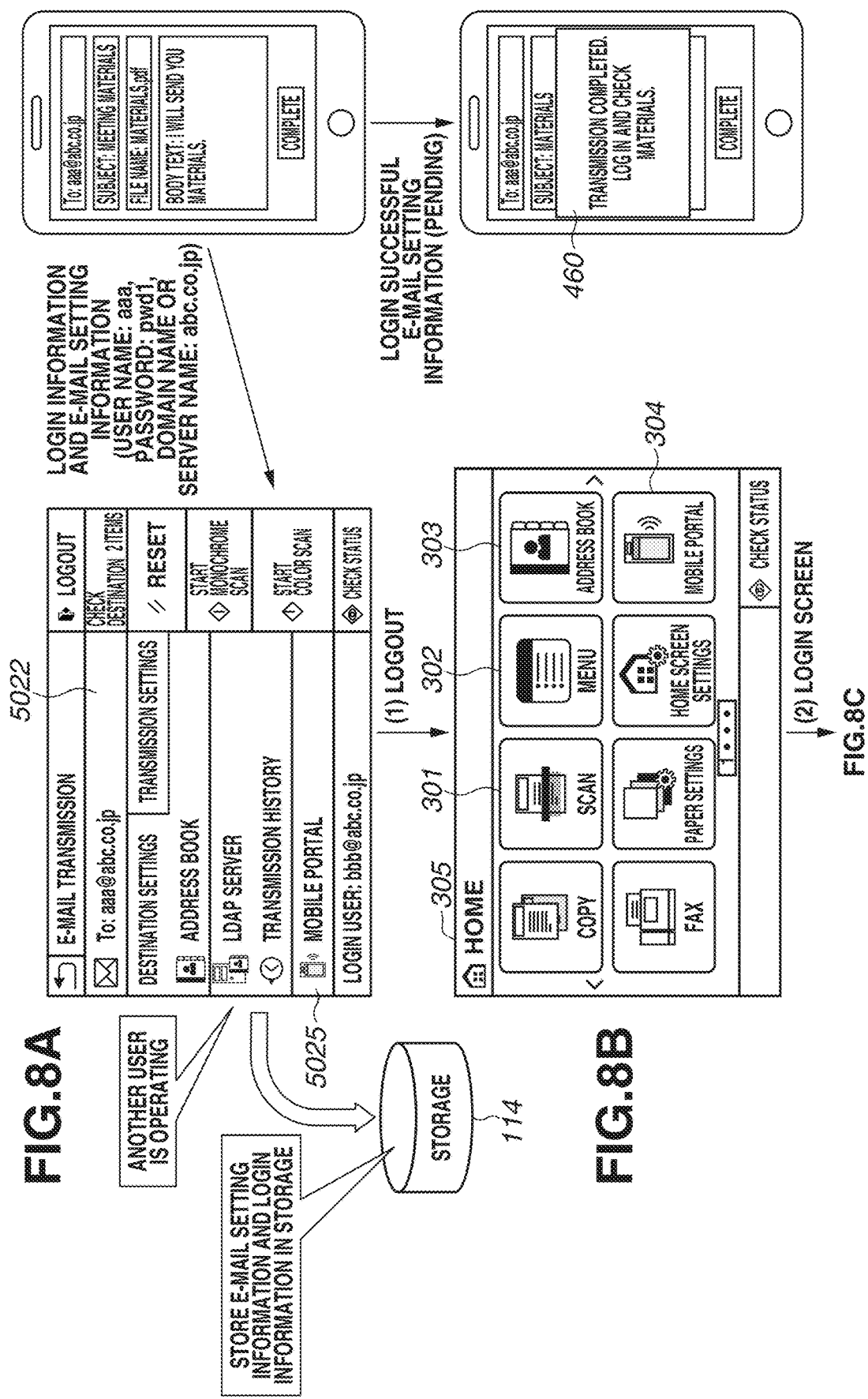

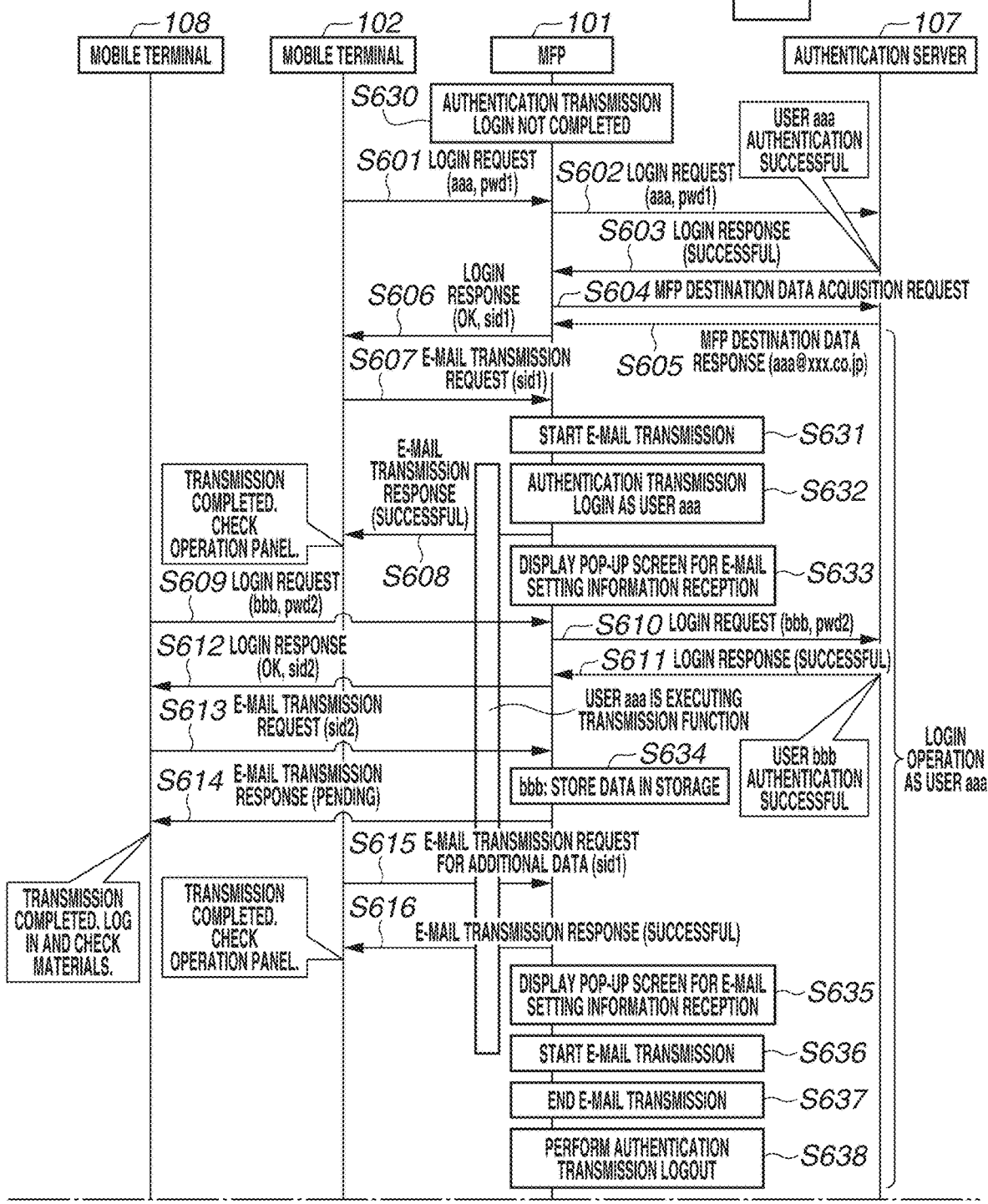

FIG. 12

| | |
|---|---|
| SETTING/REGISTRATION: FUNCTION SETTINGS: TRANSMISSION SETTINGS > TRANSMISSION FUNCTION AUTHENTICATION SETTINGS > EDITING OF TRANSMISSION FUNCTION AUTHENTICATION SETTINGS | OK  CANCEL |

EDITING OF TRANSMISSION FUNCTION AUTHENTICATION SETTINGS

CHANGE SETTINGS AS FOLLOWS:

BASIC SETTINGS
- ☑ ENABLE USER AUTHENTICATION FUNCTION — 901
  - ☐ DISPLAY CONFIRMATION SCREEN WHEN LOGGING OUT

E-MAIL TRANSMISSION SETTINGS
- E-MAIL TRANSMISSION — 902
  - ○ DO NOT PERMIT
  - ◉ PERMIT
  - ○ PERMIT ONLY MFP DESTINATION
  - ○ PERMIT ONLY DESTINATION FROM MOBILE TERMINAL
- AUTHENTICATION METHOD — 903
  - ○ DISPLAY AUTHENTICATION SCREEN USING USER NAME AT START OF TRANSMISSION OPERATION (OR MOBILE TERMINAL)
  - ○ DISPLAY EMPTY AUTHENTICATION SCREEN
  - ◉ DO NOT DISPLAY AUTHENTICATION SCREEN BY USING DEVICE-SPECIFIC AUTHENTICATION INFORMATION
- ☐ SPECIFY AUTHENTICATION USER DESTINATION AS TRANSMISSION SOURCE — 904

MOBILE TERMINAL AND ADDRESS BOOK ASSOCIATION SETTINGS
- RECEPTION OF TRANSMISSION SETTING INFORMATION FROM MOBILE TERMINAL — 905
  - ○ DO NOT PERMIT
  - ◉ PERMIT
- AUTHENTICATION METHOD WITH MOBILE TERMINAL — 906
  - ○ REMOTE UI ACCESS CODE (RAP)
    (RECEPTION OF TRANSMISSION SETTING INFORMATION IS ENABLED ONLY AFTER LOGIN WITH USER AUTHENTICATION)
  - ○ AUTHENTICATION SERVER (SERVER SET WITH AUTHENTICATION SERVER SPECIFICATION PERFORMS AUTHENTICATION)
  - ○ DOMAIN SERVER (PERFORMS AUTHENTICATION WITH DOMAIN NAME SPECIFIED BY MOBILE TERMINAL)
  - ◉ RAP + AUTHENTICATION SERVER
- 907 — AUTHENTICATION SERVER SPECIFICATION

| |
|---|
| ✓ AUTHENTICATION SERVER 1 — 950 |
| AUTHENTICATION SERVER 2 |
| AUTHENTICATION SERVER 3 |
| SERVER SPECIFIED BY MOBILE TERMINAL — 951 |

- LOGIN AS USER UPON RECEPTION OF TRANSMISSION SETTING INFORMATION — 908
  - ◉ PERMIT
  - ○ DO NOT PERMIT
- RECEPTION OF TRANSMISSION SETTING INFORMATION WHEN ONLY MFP DESTINATION IS PERMITTED — 909
  - ◉ PERMIT
  - ○ DO NOT PERMIT
- ☑ SPECIFY 'From' FOR MOBILE TERMINAL AS TRANSMISSION SOURCE — 910

900

DATA TRANSMISSION APPARATUS AND CONTROL METHOD FOR USING DATA TRANSMISSION FUNCTIONS

BACKGROUND

Field

The present disclosure relates to a data transmission apparatus for transmitting data received from an external terminal, and a control method.

Description of the Related Art

As an example of a conventional data transmission apparatus, Japanese Patent Application Laid-Open No. 2016-115974 discusses a data transmission apparatus for receiving a reading and transmission job from an external mobile terminal and, when user authentication information for the mobile terminal coincides with user authentication information for the data transmission apparatus, executing the reading and transmission job. When the user authentication information does not coincide with user authentication information for the data transmission apparatus, the data transmission apparatus discussed in Japanese Patent Application Laid-Open No. 2016-115974 stores the reading and transmission job. When the user authentication information for the data transmission apparatus is updated, the apparatus determines whether the updated user authentication information coincides with user authentication information for the mobile terminal and, when the two pieces of user authentication information coincides with each other, the apparatus executes the reading and transmission job.

SUMMARY

In some cases of data transmission apparatuses, limitations are set on data transmission destinations for each user from a viewpoint of security in performing data transmission. However, in the case of a data transmission apparatus discussed in Japanese Patent Application Laid-Open No. 2016-115974, when user information for a user of an external mobile terminal coincides with user information managed by the data transmission apparatus, the data transmission apparatus can readily perform data transmission by using transmission settings received from the mobile terminal. This gives rise to an issue that security cannot be ensured although the use of data transmission is limited by user authentication. The present disclosure has been devised in view of at least one of the above-described issues, and features improving security of data transmission.

According to an aspect of the present disclosure, a data transmission apparatus including a transmission unit configured to transmit data to a transmission destination set as a destination of a transmission function, a reception unit configured to receive a destination to be used by the transmission function from an external terminal, a transmission unit configured to set the received destination as a destination to be used by the transmission function and to transmit data to the destination, a setting unit configured to set whether to perform user authentication when using the transmission function is used, and a control unit configured to, according to user authentication set to be performed when using the transmission function by the setting unit, controls the transmission unit not to set the destination as a destination to be used by the transmission function, based on a setting that is set by the setting unit and enables user authentication to be performed when the transmission function is used.

Further features of the present disclosure will become apparent from the following description of exemplary embodiments with reference to the attached drawings.

BRIEF DESCRIPTION OF THE DRAWINGS

FIGS. 5A, 5B, 5C, 5D and 5E are diagrams illustrating screen transitions on the mobile terminal when transmitting E-mail setting information.

FIGS. 6A, 6B, 6C, 6D and 6E are diagrams illustrating screen transitions on the MFP upon reception of login information and E-mail setting information.

FIGS. 7A, 7B, 7C, 7D and 7E are diagrams illustrating screen transitions on the MFP upon reception of login information and E-mail setting information.

FIGS. 8A, 8B, 8C and 8D are diagrams illustrating screen transitions on the MFP upon reception of login information and E-mail setting information.

FIG. 12 is a diagram illustrating an example of a transmission function setting screen displayed on the operation unit of the MFP.

DESCRIPTION OF THE EMBODIMENTS

Exemplary embodiments of the present disclosure will be described below with reference to the accompanying drawings. The following exemplary embodiments do not limit the present disclosure. Not all of the combinations of the features described in the exemplary embodiments are indispensable to the solutions according to the present disclosure.

A first exemplary embodiment of the present disclosure will be described below.

Figure 1:
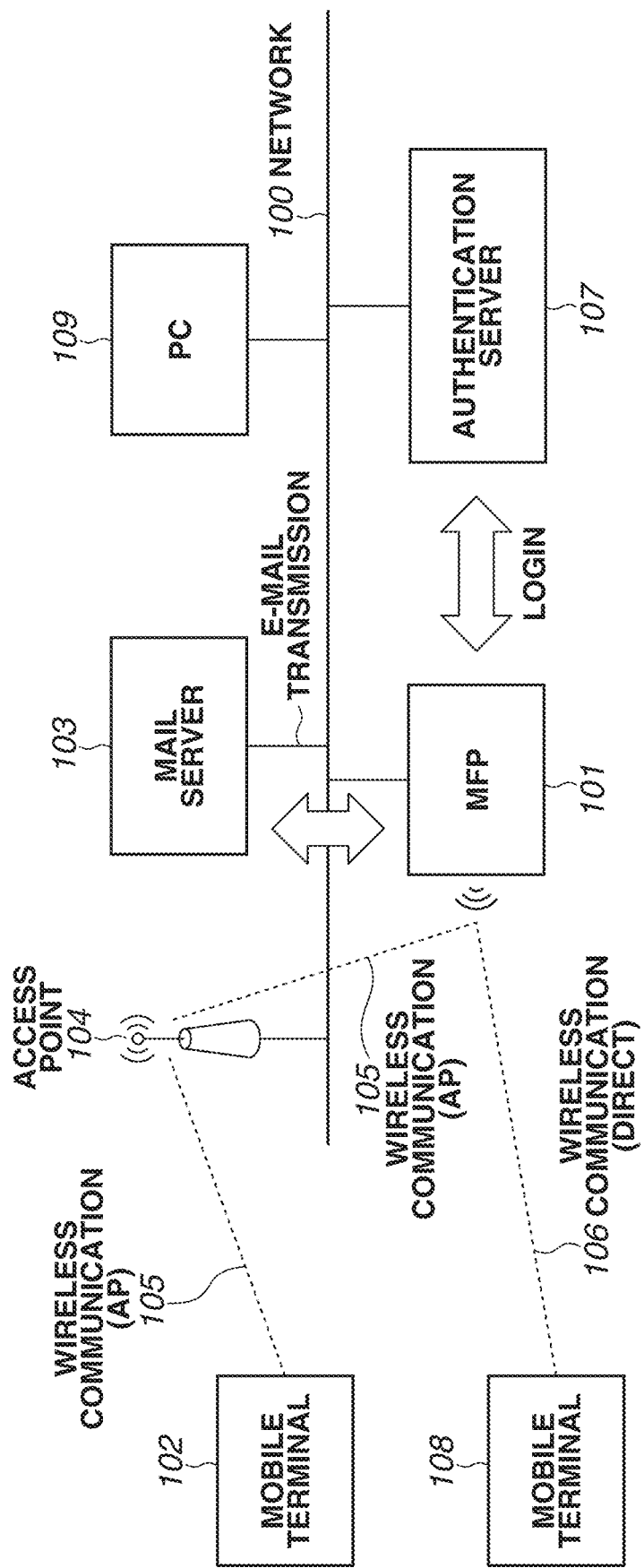
FIG. 1 is a block diagram illustrating a network configuration of a data transmission system.

FIG. 1 is a block diagram illustrating a network configuration of a data transmission system according to the present exemplary embodiment.

The data transmission system includes a Multi Function Peripheral (MFP) 101 as an example of a data transmission apparatus, a mail server 103 as an example of a transmission destination, and an authentication server 107 as an example of an authentication destination. The MFP 101, the mail server 103, an access point 104, and a personal computer (PC) 109 are connected on a network 100 so that they can communicate with each other.

Mobile terminals 102 and 108 are examples of external terminals, for example, smart phones. The mobile terminal 102 is connected with the access point 104 via wireless communication 105, and is connected with the mail server 103 and the MFP 101 via the network 100 so that they can communicate with each other. The MFP 101 having a wireless communication function is connected with the mobile terminal 102 via the access point 104 using wireless communication 105, and is directly connected with the mobile terminal 108 using wireless communication 106.

The MFP 101 has an image processing function and sends an E-mail to the mail server 103. The MFP 101 uses image data of a scanned document as an attached file for the E-mail and specifies the destination mail address as a transmission destination. The MFP 101 also transmits image data to a file server (not illustrated) by using a communication protocol for file transmission, such as Server Message Block (SMB), File Transmission Protocol (FTP), and Web-based Distributed Authoring and Versioning (WebDAV).

The mail server 103 supports Simple Mail Transfer Protocol (SMTP). The mail server 103 receives an E-mail using the SMTP protocol and stores the received E-mail in a mail box in a storage (not illustrated) of the mail server 103 and forwards the E-mail to an external mail server (not illustrated) on the network 100.

The authentication server 107 is a server for managing information about a user and the PC 109 based on Lightweight Directory Access Protocol (LDAP) via the network 100. The authentication server 107 stores account information including the user name and password, and user data including the company name, section, mail address, telephone number, and folder information.

The MFP 101 accesses the authentication server 107 based on LDAP and performs the authentication of a login request by using the account information. Then, the MFP 101 acquires the mail address and folder information for the login user as the mail address and the folder of the MFP 101 itself, respectively, from the authentication server 107.

Figure 2:
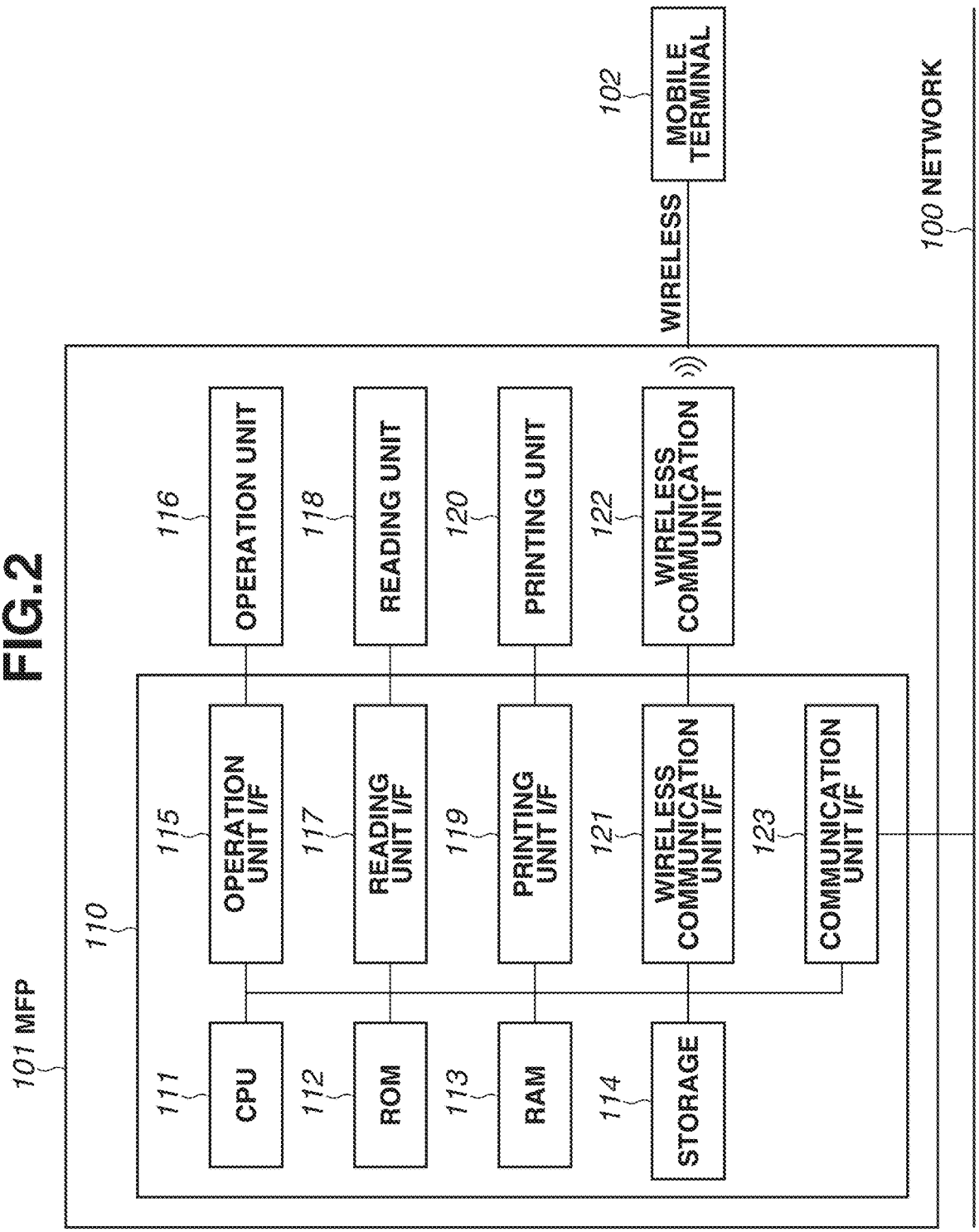
FIG. 2 is a block diagram illustrating a hardware configuration of a Multi Function Peripheral (MFP).

FIG. 2 is a block diagram illustrating a hardware configuration of the MFP 101.

A control unit 110 including a Central Processing Unit (CPU) 111 controls operations of the entire MFP 101. The CPU 111 reads control programs stored in a Read Only Memory (ROM) 112 or a storage 114 and performs various types of control including reading control, printing control, operation unit control, and wired and wireless network communication control.

The ROM 112 stores control programs executable by the CPU 111. The ROM 112 also stores a boot program and font data.

A Random Access Memory (RAM) 113 is the main memory of the CPU 111 and is used as a work area and a temporary storage area for loading various control programs stored in the ROM 112 and the storage 114.

The storage 114 stores image data, print data, various programs, and various setting information (such as address book). According to the present exemplary embodiment, the storage 114 is a nonvolatile flash memory from which stored information is not erased when power is turned OFF and ON. Alternatively, auxiliary storage units such as a Solid State Drive (SSD), a Hard Disk Drive (HDD), and an Embedded Multi Media Card (eMMC) may also be applicable.

In the MFP 101 according to the present exemplary embodiment, one CPU 111 performs processing illustrated in flowcharts (described below) by using one memory (RAM 113). Alternatively, other forms may also be applicable. For example, a plurality of CPUs, RAMs, ROMs, and storages may be operated in a collaborative way to perform each piece of processing of flowcharts (described below). Further, a part of processing may be performed by using a hardware circuit such as an Application Specific Integrated Circuit (ASIC) and a Field Programmable Gate Array (FPGA).

An operation unit interface (I/F) 115 connects between an operation unit 116 and the control unit 110. The operation unit 116 notifies the user of information and detects an input from the user.

A reading unit I/F 117 connects between a reading unit 118 and the control unit 110. The reading unit 118 reads an image on a document and converts the image into image data such as binary data. The image data generated by the reading unit 118 is transmitted to an external apparatus and printed on recording paper.

A printing unit I/F 119 connects between the printing unit 120 and the control unit 110. The CPU 111 transmits image data (image data subjected to printing) stored in the RAM 113 to the printing unit 120 via the printing unit I/F 119. The printing unit 120 prints the transmitted image data on recording paper fed from a feeding cassette.

A communication unit i/F 123 connects between the control unit 110 and the network 100. The communication unit I/F 123 transmits image data and various information inside the apparatus to an external apparatus on the network 100, and receives print data from an information processing apparatus on the network 100 and various information. As a method for transmitting and receiving data via a network, the above-described transmission and reception using E-mail and file transmission based on other protocols (for example, FTP, SMB, WebDAV, etc.) can also be performed.

A wireless communication unit i/F 121 is an interface for controlling a wireless communication unit 122. The wireless communication unit i/F 121 connects between external wireless apparatuses (the mobile terminals 102 and 108 and the access point 104 in this case) and the control unit 110 by using the wireless communications 105 and 106.

The MFP 101 has a web server function and is capable of displaying transmission and reception job histories and various setting data on the PC 109 connected to the network 100 when the user accesses the MFP 101 from the PC 109 based on HyperText Transfer Protocol (HTTP).

Figure 3:
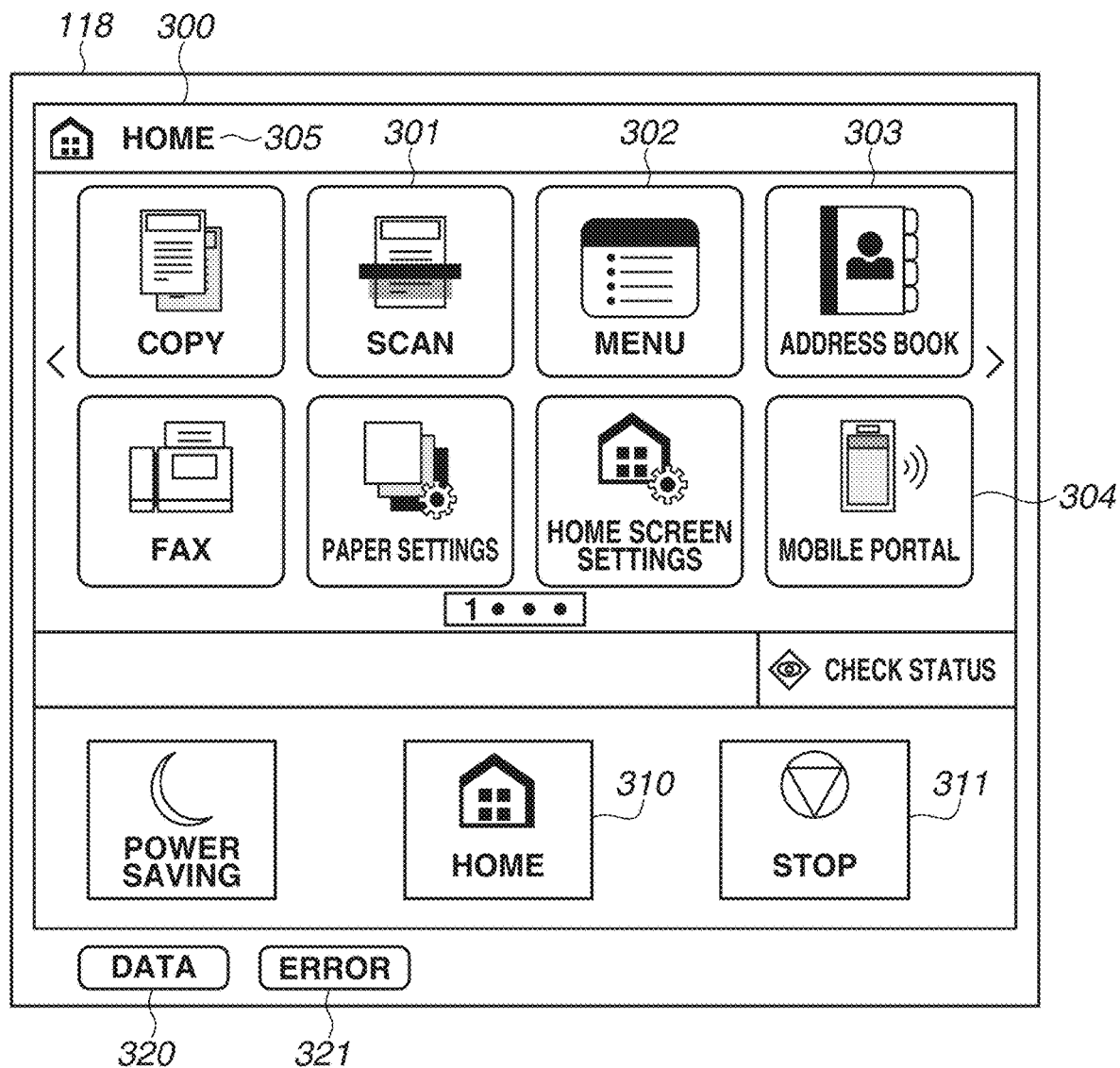
FIG. 3 is a diagram illustrating an example of a home screen displayed on an operation unit of the MFP.

FIG. 3 illustrates an example of a "Home" screen 305 displayed on the operation unit 116 of the MFP 101.

The operation unit 116 includes a touch panel 300 for displaying an operation screen, a data light emitting diode (LED) 320, and an error LED 321.

The touch panel 300 functions as an input unit for receiving user instructions (touch, drag, and flick) and as a unit for displaying a screen for the user. The user directly touches each image (button) in the screen displayed on the touch panel 300 with an object, such as a finger or stylus pen, to issue an execution instruction for a function in accordance with the displayed button. According to the present exemplary embodiment, a button refers to a marked-out area indicated by a displayed image. When the operation unit I/F 115 detects a touch on (depression of) a button, the CPU 111 of the MFP 101 performs controller control related to the pressed image.

The touch panel 300 illustrated in FIG. 3 displays the "Home" screen 305 displayed immediately after activating the MFP 101. The "Home" screen 305 displays function buttons, including "Scan" 301, "Menu" 302, "Address book" 303, and "Mobile portal" 304, of functions performed by the MFP 101.

The "Scan" button 301 is used to change the screen to a transmission setting screen for executing E-mail transmission and file transmission from the MFP 101 based on SMB, FTP, and WebDAV.

The "Menu" button 302 is used to change the screen to the setting menu screen of the MFP 101.

The "Address book" button 303 is used to display an address book screen of the MFP 101 (described below). When a transmission destination, for E-mail transmission or the like, is specified from the displayed address book, the screen can be changed to an "E-mail transmission" screen. The destination data in the address book includes a transmission type (E-mail, file, fax, etc.), name, destination data (mail address, host name, server information, etc.), account information (user name and password), and is stored in the storage 114. In the "E-mail transmission" screen, multi-address transmission in which a plurality of set destination data instead of a single destination data is specified can also be set.

The "Mobile portal" button 304 is used to display various setting information for connecting the MFP 101 and the mobile terminals 102 and 108 in a mobile portal screen (not illustrated). The mobile portal screen displays a button for instructing the MFP 101 to start direct wireless connection between the MFP 101 and the mobile terminal 108. The mobile portal screen also displays various setting information for performing communication between the MFP 101 and the mobile terminal 102 using the network 100 via the access point 104, and various setting information, such as the Service Set Identifier (SSID)/Personal Identification Number (PIN) code, for direct communication between the MFP 101 and the mobile terminal 108.

A "Stop" button 311 is used to instruct the MFP 101 to cancel each operation to the MFP 101.

A "Home" button 310 is used to change the screen to the "Home" screen 305 of the MFP 101.

The "Stop" button 311 and the "Home" button 310 are normally displayed on the operation unit 116.

The data LED 320 and the error LED 321 notify the user of the state of the MFP 101. The data LED 320 turns ON during execution of a transmission job and a print job. The error LED 321 turns ON if an error (jam, paper out, etc.) occurs in the MFP 101.

FIGS. 4A, 4B, and 5A to 5E illustrate transitions of screens displayed on the mobile terminal 102 by an E-mail setting application. The E-mail setting application is an application having a function of transmitting E-mail setting information from the mobile terminal 102 to the MFP 101 (E-mail setting function). The E-mail setting information includes the destination, subject, file name, and body text of an E-mail when transmitting transmission data, such as an image scanned by the MFP 101, by E-mail. According to the present exemplary embodiment, the E-mail setting information is set on the mobile terminal 102.

Figure 4A:
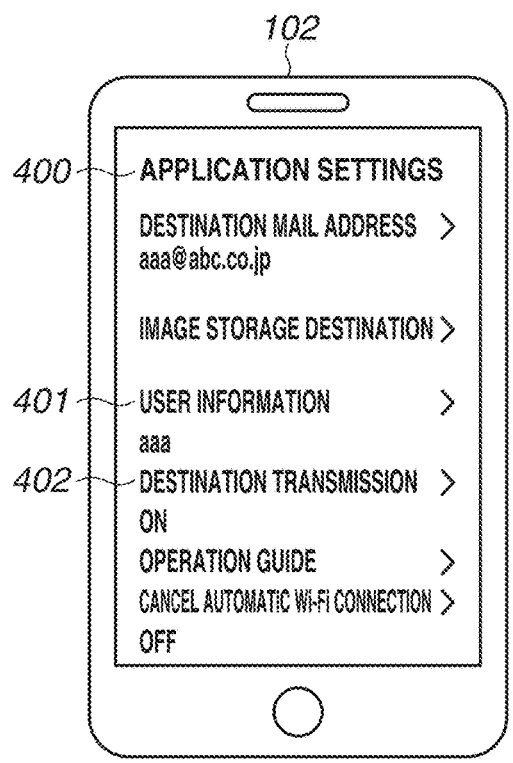
FIGS. 4A and 4B are diagrams illustrating a screen transition on a mobile terminal when setting user information.
Figure 4B:
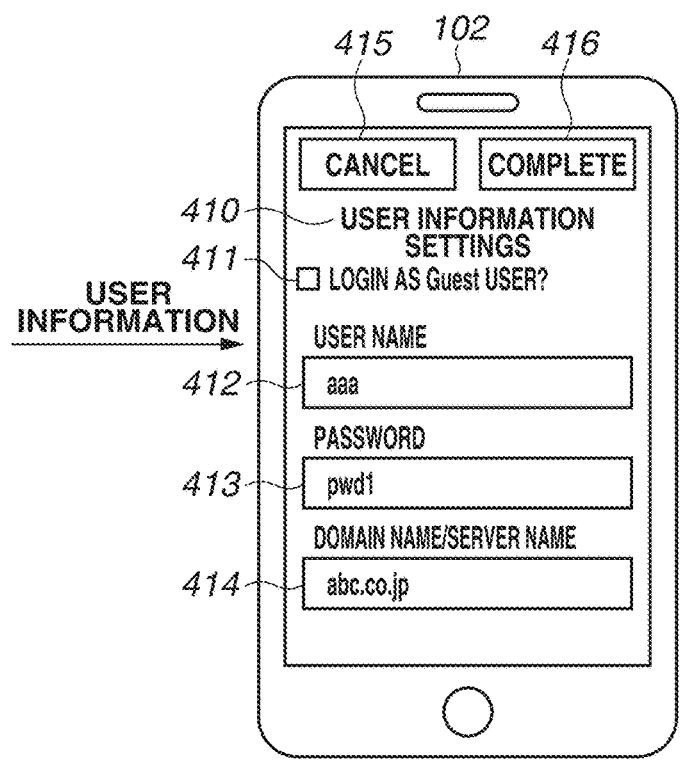

FIGS. 4A and 4B illustrate screens for setting user information as examples of screens displayed on the mobile terminal 102 by a transmission setting application. The user information serves as login information which functions as user identification information to be used to log into the MFP 101 from the mobile terminal 102.

In an "Application settings" screen 400 illustrated in FIG. 4A, "User information" 401 is pressed to change the screen from the "Application settings" screen 400 to a "User information settings" screen 410 illustrated in FIG. 4B.

"Destination transmission" 402 is pressed to transmit the E-mail setting information. When "Destination transmission" 402 is pressed, only "ON" of "ON/OFF" (not illustrated) is displayed, and the E-mail setting information is transmitted. The depression of "Destination transmission" 402 is displayed below "Destination transmission" 402. In the example illustrated in FIG. 4A, "ON" is displayed in the "Destination transmission" field 402.

When "User information" 401 is pressed in the "Application settings" screen 400 illustrated in FIG. 4A, the screen of the mobile terminal 102 changes to the "User information settings" screen 410 illustrated in FIG. 4B.

In the "User information settings" screen 410 illustrated in FIG. 4B, a user name that is used to log into the MFP 101 is input to a "User name" field 412.

A password that is used to log into the MFP 101 is input to a "Password" field 413.

A domain name or server name for accessing the authentication server 107, that is used to log into the MFP 101 from the mobile terminal 102 is input to a "Domain name/server name" 414.

When logging in as a guest user having user name "guest", check a "User logs in as Guest user?" check box 411. When the "User logs in as Guest user?" check box 411 is checked, the contents input in the "User name" field 412, the "Password" field 413, and the "Domain name/server name" field 414 are invalidated.

FIGS. 5A to 5E are diagrams illustrating an E-mail transmission setting screen 430 for transmitting the E-mail setting information by using the E-mail setting application, and screen transitions on the mobile terminal 102 after the mobile terminal 102 receives a response from the MFP 101.

When the E-mail setting application is activated, a Home screen 420 (see FIG. 5A) is displayed on the mobile terminal 102. In addition to the function of setting an E-mail transmission destination (E-mail setting function), the E-mail setting application has a function of instructing the MFP 101 to perform printing, scanning, and image editing.

The Home screen 420 displays a state of wireless connection with the MFP 101 (direct connection in the example illustrated in FIG. 5A). The Home screen 420 displays a Document of a printing application, a Scan of a scan application, a Capture of an image editing application, and "Destination transmission" 421 for executing an E-mail transmission function.

When "Destination transmission" 421 is pressed, the screen of the mobile terminal 102 changes to the E-mail transmission setting screen 430 illustrated in FIG. 5B.

The E-mail transmission setting screen 430 illustrated in FIG. 5B is a screen for setting the E-mail setting information (destination, subject, file name, main body of an E-mail to be transmitted) to the MFP 101, from the mobile terminal 102.

For a "To:" destination setting text box 431, an E-mail transmission destination is directly input by using a keyboard (not illustrated) of the mobile terminal 102, or an E-mail address is selected from the address book (described below) of the mobile terminal 102.

A "Call address book" button 436 is pressed to display a screen for selecting an E-mail address from the address book. When the "Call address book" button 436 is pressed, the address book is displayed on the mobile terminal 102, enabling the user to select an E-mail address for specifying a destination.

A "Subject" text box 432 is used to input a subject of the E-mail to be transmitted by using the keyboard of the mobile terminal 102. A "File name" text box 433 is used to input a file name of the E-mail to be transmitted by using the keyboard of the mobile terminal 102.

A "Body text" text box 434 is used to input a body text of the E-mail to be transmitted by using the keyboard of the mobile terminal 102.

In the E-mail transmission setting screen 430 illustrated in FIG. 5B, when the "Send" button 435 is pressed, the mobile terminal 102 transmits the set E-mail setting information (destination, subject, file name, and body text) to the MFP 101 as an E-mail transmission request. After transmission of the E-mail transmission request, the mobile terminal 102 receives an E-mail transmission response from the MFP 101. Upon reception of the E-mail transmission response, any one of messages 440, 450, and 460 (illustrated in FIGS. 5D, 5E, and 5C, respectively) is displayed on the mobile terminal 102 according to the contents.

When an E-mail transmission response (successful) is received from the MFP 101, the message 440 "Transmission completed. Check operation panel." is displayed on the mobile terminal 102 (see FIG. 5D).

When an E-mail transmission response (pending) is received from the MFP 101, the message 460 "Transmission completed. Log in and check transmission response." is displayed on the mobile terminal 102 (see FIG. 5C).

When an E-mail transmission response (failed) is received from the MFP 101, the message 450 "Transmission failed. Check transmission settings." is displayed on the mobile terminal 102 (see FIG. 5E).

In addition, messages for responses from the MFP 101, such as a login failure and the exceeded maximum number of destinations, are displayed on the mobile terminal 102.

Figure 10A:
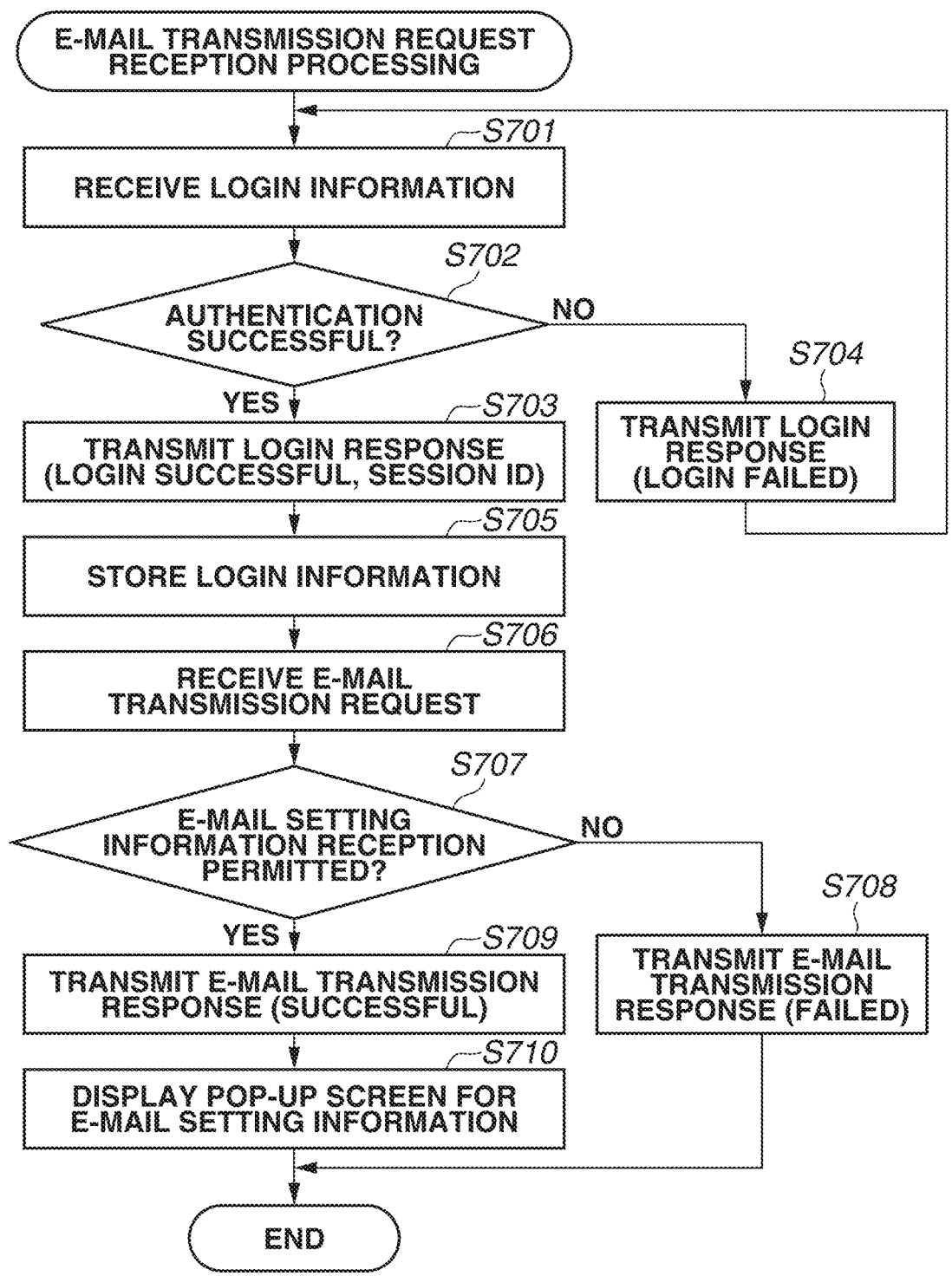
FIG. 10A is a flowchart illustrating processing for receiving an E-mail transmission request according to a first exemplary embodiment.

Processing performed by the MFP 101 upon reception of an E-mail transmission request from the mobile terminal 102 (E-mail transmission request reception processing) will be described below with reference to FIGS. 10A to 10C. FIG. 10A is a flowchart illustrating the E-mail transmission request reception processing performed by the MFP 101 according to the first exemplary embodiment.

The MFP 101 starts the E-mail transmission request reception processing upon reception of an E-mail transmission request transmitted from the mobile terminal 102 via the network 100, the wireless communication 105, or the wireless communication 106. In the E-mail transmission request reception processing, the MFP 101 transmits the contents of the processing result to the mobile terminal 102, as described below.

The processing in the flowchart illustrated in FIG. 10A is implemented when the CPU 111 of the MFP 101 controls the touch panel 300 of the operation unit 116, the reading unit 118, and the communication unit I/F 123 to access data recorded in the storage 114.

When the "Send" button 435 is pressed in the E-mail transmission setting screen 430 (see FIG. 5B) of the mobile terminal 102, then in step S701, the MFP 101 receives the login information from the mobile terminal 102. The login information transmitted from the mobile terminal 102 includes a user name, password, server name or domain name.

The MFP 101 accesses the authentication server 107 by using the server name or domain name included in the login information and transmits a login request for LDAP authentication to the authentication server 107 by using the user name and password included in the login request.

Upon reception of the login information from the MFP 101, the authentication server 107 determines whether the user name and password included in the login information coincide with the user name and password registered in the authentication server 107, respectively.

When both the user name and the password coincide with each other between the two pieces of information, the authentication server 107 transmits successful authentication information (login successful) to the MFP 101. Meanwhile, when at least either the user name or the password do not coincide with each other between the two pieces of information, the authentication server 107 transmits authentication failure information (login failed) to the MFP 101.

In step S702, the MFP 101 determines whether successful authentication information (login successful) is received from the authentication server 107. In a case where the MFP 101 determines that successful authentication information (login successful) is received (YES in step S702), the processing proceeds to step S703. Meanwhile, in a case where the MFP 101 determines that authentication failure information (login failed) is received (NO in step S702), the processing proceeds to step S704.

In a case where the MFP 101 determines that successful authentication information is received (YES in step S702), then in step S703, the MFP 101 transmits a login response, successful login information and the session identifier (ID), to the mobile terminal 102. The session ID is a uniquely determined character string including random alphanumeric characters generated to identify a user name. The session ID is generated in association with the user name by the MFP 101.

After login in step S703, when the MFP 101 receives the session ID from the mobile terminal 102, the MFP 101 identifies the user name associated with the session ID and processes received data, thus avoiding the duplicated login processing (step S701). If the session ID is not included in the data received from the mobile terminal 102, the MFP 101 processes the data as request data with an undefined user name.

Meanwhile, when the MFP 101 determines that authentication failure information is received (NO in step S702), then in step S704, the MFP 101 transmits a login response a authentication failure information (login failed) to the mobile terminal 102.

In step S705, the MFP 101 stores the login information (user name, password, and server name or domain name) received from the mobile terminal 102 in the storage 114.

In step S706, the MFP 101 receives an E-mail transmission request from the mobile terminal 102. Then, the MFP 101 associates the E-mail setting information (destination, subject, file name, and body text) included in the received E-mail transmission request with the login information stored in step S705, and stores the E-mail setting information in the storage 114.

In step S707, the MFP 101 determines whether "Permit" is set for "Reception of transmission setting information from mobile terminal" 905 in the "Editing of transmission function authentication settings" screen (see FIG. 12). In a case where "Permit" is set for "Reception of transmission setting information from mobile terminal" 905 (YES in step S707), the processing proceeds to step S709. In a case where "Do not permit" is set (NO in step S707), the processing proceeds to step S708.

"Editing of transmission function authentication settings" is used in the MFP 101 to set limitations on the E-mail transmission function (for example, E-mail transmission destination) for an authenticated user. To disable the E-mail transmission function, "Do not permit" is set for "Reception of transmission setting information from mobile terminal" 905.

For the E-mail transmission function, various limitations can be set for each user (descried below) in the "Editing of transmission function authentication settings" screen. Various limitations which can be set in the "Editing of transmission function authentication settings" screen will be described in detail below with reference to FIG. 12.

In a case where "Do not permit" is set for "Reception of transmission setting information from mobile terminal" 905 (NO in step S707), the MFP 101 does not receive the E-mail setting information transmitted from the mobile terminal 102. Therefore, the user cannot use the E-mail transmission function of the MFP 101 from the mobile terminal 102. Then, in step S708, the MFP 101 transmits an E-mail transmission response (failed) (see FIG. 5E) to the mobile terminal 102.

Meanwhile, when "Permit" is set (YES in step S707), then in step S709, the MFP 101 sets the E-mail setting information included in the received E-mail transmission request to the "E-mail transmission" screen 5020 (illustrated below in FIGS. 6A-6E to 8A-8D) displayed on the touch panel 300. Then, the MFP 101 transmits an E-mail transmission response (successful) (see FIG. 5D) to the mobile terminal 102.

In step S710, the MFP 101 displays a pop-up screen 5010 in the "E-mail transmission" screen 5020 to notify the user that the E-mail setting information received from the mobile terminal 102 is set in the "E-mail transmission" screen 5020. The above-described screens displayed on the touch panel 300 of the MFP 101 will be described in detail below with reference to FIGS. 6A-6E to 8A-8D.

An authentication transmission function setting screen for setting the E-mail transmission function after authentication in the MFP 101 will be describe below with reference to FIG. 12. The authentication transmission function (hereinafter referred to as authentication transmission) refers to a function of authenticating the authentication server 107 by using the login information and, when the authentication is successful, enabling the transmission settings (E-mail, files, etc.) and the transmission function of the MFP 101. FIG. 12 is a diagram illustrating an example of a transmission function setting screen 900 displayed on the operation unit 116 of the MFP 101 when the user accesses the web server of the MFP 101 by using a web browser of the PC 109.

The set E-mail transmission function is stored in the storage 114. In addition, after the set E-mail transmission function is loaded at the time of execution, the E-mail transmission function can be changed using the operation unit 116. The user may be able to set the E-mail transmission function or use the function by reading stored default settings of the MFP 101.

In the transmission function setting screen 900, an "Enable user authentication function" check box 901 in a "Basic settings" field is a setting for displaying a transmission authentication login screen (see FIG. 8C) to prompt the user to perform user authentication when using the transmission function. When this setting is checked, "E-mail transmission settings" and "Mobile terminal and address book association settings" (described below) can be set.

"E-mail transmission" 902 in the "E-mail transmission settings" field is used for setting a "Destination settings" tab 5021 (see FIG. 6C) for E-mail transmission for each login user so that destinations are limited to predetermined specific destinations. This enables the MFP 101 to limit E-mail destinations to which each login user can transmit an E-mail.

When "Do not permit" is set for "E-mail transmission" 902, the E-mail transmission is inhibited even after the user logs into the MFP 101. When "Permit" is set, the login user can perform the E-mail transmission without limitation of the destination.

When "Permit only MFP destination" is set for "E-mail transmission" 902, the E-mail transmission destination is limited to the destination of the login user. In this case, only a "Transmission to MFP itself" button 5023 is enabled in the "E-mail transmission" screen 5020 (see FIG. 6C). This enables limiting the E-mail transmission from the MFP 101 to the destination of the user who transmits an E-mail.

When "Permit only destination from mobile terminal" is set for "E-mail transmission" 902, the E-mail transmission from the MFP 101 can be limited to the destination to which the E-mail setting information has been transmitted from the mobile terminal 102. In this case, only "Mobile portal" 5025 (see FIG. 8A) is enabled in the "E-mail transmission" screen 5020.

"Authentication method" 903 is a setting related to the user name and password to be used in SMTP authentication at the time of E-mail transmission. For this setting item, one of the following three options can be selected: "Display authentication screen using user name at start of transmission operation (or mobile terminal)", "Display empty authentication screen", and "Do not display authentication screen by using device-specific authentication information".

A "Specify authentication user destination as transmission source" check box 904 specifies whether the mail address of the login user acquired from the authentication server 107 when logging in is specified.

"Reception of transmission setting information from mobile terminal" 905 in the "Mobile terminal and address book association settings" field sets whether to permit the reception of the E-mail setting information from the mobile terminal 102. When "Permit" is set, the MFP 101 receives the E-mail setting information transmitted from the mobile terminal 102. When "Do not permit" is set, the MFP 101 does not receive the E-mail setting information, and therefore the user cannot transmit the E-mail via the mobile terminal 102.

"Authentication method with mobile terminal" 906 is a setting related to authentication information to be used in authenticating the mobile terminal 102.

When "Remote UI access password (RAP)" is set, the MFP 101 performs a login operation based on the E-mail setting information received from the mobile terminal 102 by using the password that is used for accessing a remote UI. When a RAP is used, the E-mail transmission function is enabled after an authentication transmission login because the authentication is based on a 7-digit number (PIN) instead of a user name and a password. When "Authentication server" is set, the authentication server set using "Authentication server specification" 907 (described below) authenticates the login information transmitted from the mobile terminal 102.

When "RAP+Authentication server" is set, the MFP 101 performs the authentication in two steps, i.e., the authentication based on the login information received from the mobile terminal 102 and then the authentication based on a RAP.

When "Domain server" is set, the MFP 101 performs Domain Name System (DNS)-based search for a domain server using the domain name received from the mobile terminal 102, and performs the authentication on the detected domain server by using the login information transmitted from the mobile terminal 102.

"Authentication server specification" 907 of "Authentication method with mobile terminal" 906 is a menu for specifying an authentication server ("Authentication server 1" to "Authentication server 3" 950) set in the MFP 101. When "Server specified by mobile terminal" 951 is specified, the user specifies the authentication server 107 from "Domain name/server name" 414 (see FIG. 4B) set in "User information settings" on the mobile terminal 102.

"Login as user upon reception of transmission setting information" 908 is a setting for omitting authentication transmission login processing when the user performs a login operation from the mobile terminal 102. When "Permit" is set, after the mobile terminal 102 transmits data, the screen changes to the "E-mail transmission" screen 5020 (see FIG. 8D) and displays the pop-up screen 5010 without displaying an "Authentication transmission login" screen 5210 (see FIG. 8C).

"Reception of transmission setting information when only MFP destination is permitted" 909 is a setting for permitting the E-mail transmission function for data from the mobile terminal 102 when "Permit only MFP destination" is set for "E-mail transmission" 902.

A "Specify 'From' for mobile terminal as transmission source" check box 910 is a setting for setting 'From' as a transmission source in mail settings or application settings on the mobile terminal 102. When the "Specify 'From' for mobile terminal as transmission source" check box 910 is checked, the From information is added to the E-mail setting information from the mobile terminal 102.

Transitions of screens displayed on the touch panel 300 of the MFP 101 upon reception of the E-mail setting information from the mobile terminal 102 will be described below with reference to FIGS. 6A-6E to 8A-8D.

FIGS. 6A to 6E illustrate examples of transitions of screens on the operation unit 116 of the MFP 101 when user aaa receives the login information and the E-mail setting information from the mobile terminal 102 in a state where no user logs into the MFP 101 (S511). The login information includes a user name (aaa), a password (pwd1), a domain name or server name (abc.@co.jp). The E-mail setting information includes a destination (aaa@abc.co.jp), a subject ("Meeting materials"), a file name (materials), and a body text ("I will send you materials of the meeting the other day").

When the authentication by the authentication server 107 is successful and the E-mail setting information is set in the "E-mail transmission" screen 5020, the screen changes from the "Home" screen 305 (see FIG. 6A) to the "E-mail transmission" screen 5020 (see FIG. 6B) and displays the pop-up screen 5010. In this case, the "Authentication transmission login" screen 5210 (see FIG. 8C) is not displayed (S512).

Then, the MFP 101 stores the login information and the E-mail setting information received from the mobile terminal 102 in the storage 114. Then, the MFP 101 acquires information about the mail address of the login user to be set for "Transmission to MFP itself" 5023 and folder information to be used in file transmission from the authentication server 107, and stores the acquired information in the storage 114. To avoid the authentication processing by the same user, the MFP 101 generates a session ID and transmits the session ID to the mobile terminal 102.

If the E-mail setting information cannot be set, the MFP 101 transmits an E-mail transmission response (failed) (see FIG. 5E) and does not change the screen to the "E-mail transmission" screen 5020 (see FIG. 6B).

When "OK" 5011 in the pop-up screen 5010 is pressed in the "E-mail transmission" screen 5020 (see FIG. 6B), the MFP 101 displays the "E-mail transmission" screen 5020 (see FIG. 6C) for performing the E-mail transmission (S513).

When the MFP 101 receives the E-mail setting information (destination, subject, file name, and body text) with the same session ID from the mobile terminal 102 in the "E-mail transmission" screen 5020 (see FIG. 6C), the MFP 101 displays the pop-up screen 5010 again (S514). In this case, the destination is added to, and the subject/body text and file name are overwritten on the E-mail setting information in the "E-mail transmission" screen 5020. Then, the E-mail setting information is also stored in the storage 114.

In the "E-mail transmission" screen 5020, a screen for the "Destination settings" tab 5021 (see FIG. 6C) and a screen for a "Transmission settings" tab 5030 (see FIG. 6D) are displayed in an exclusive way (S515 and S516). The screen for the "Destination settings" tab 5021 is used to specify an E-mail transmission destination. The screen for the "Transmission settings" tab 5030 is used to specify a document size and a file format (Portable Document Format (PDF)/Tagged Image File Format (TIFF)/Joint Photographic Experts Group (JPEG)).

When "Logout" 5028 is pressed in the "E-mail transmission" screen 5020, the screen display returns to the "Home" screen 305 (see FIG. 6A).

When "Start monochrome scan" 5026 or "Start color scan" 5027 is pressed in the "E-mail transmission" screen 5020, the screen changes to a "Reading/transmission in progress" screen 5091 (see FIG. 6E) to perform the E-mail transmission (S517).

When the user performs an authentication transmission login, "User name, domain name" is displayed in "Login user" 5029. When "Start monochrome scan" 5026 or "Start color scan" 5027 is pressed, the MFP 101 controls the reading unit 118 to scan a document such as paper to generate image data. Upon completion of document reading, the MFP 101 specifies the destination set in the above-described processing as a transmission destination and transmits an E-mail with attached data (PDF/TIFF/JPEG data) based on the image data.

Figure 7A:
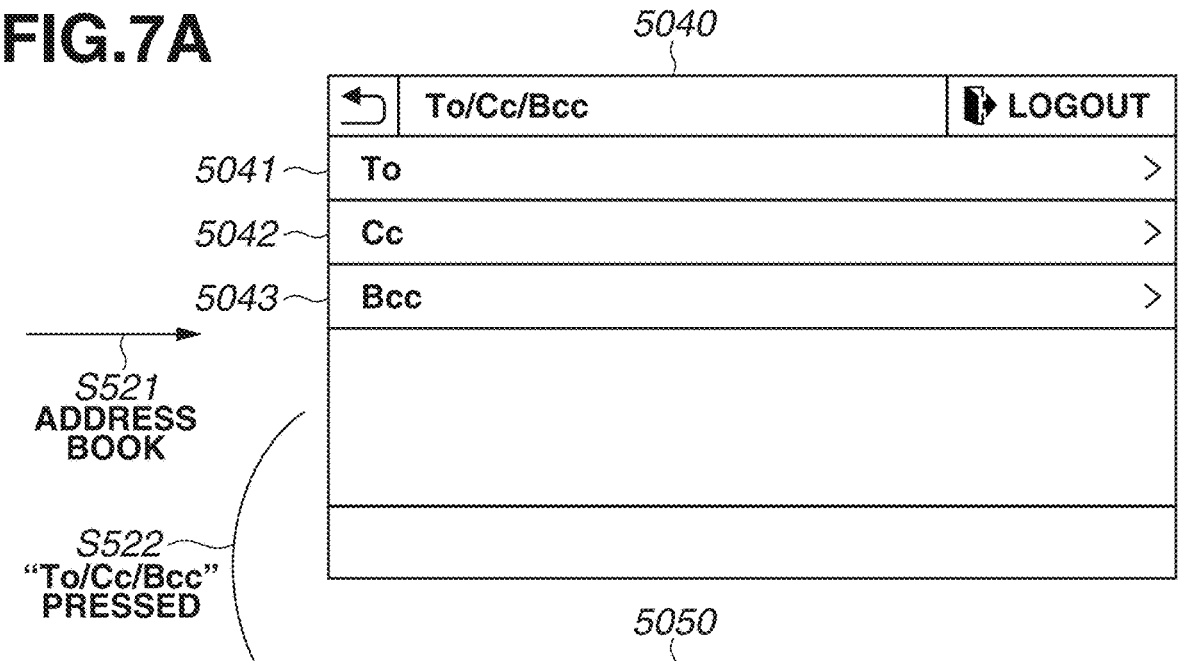
Figure 7B:
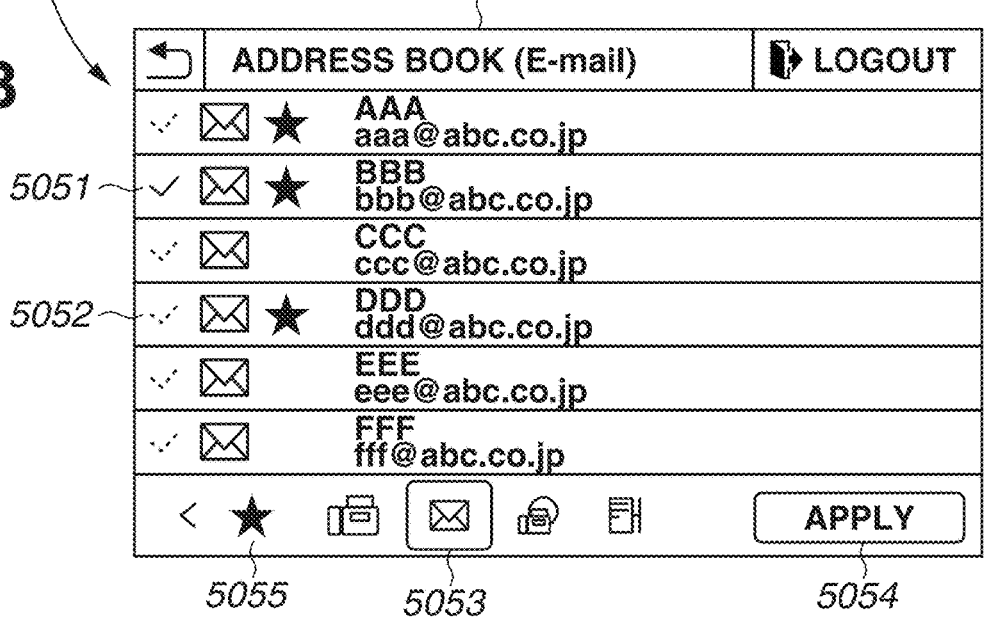

When "Transmission to MFP itself" 5023 in the "Destination settings" tab 5021 is pressed in the "E-mail transmission" screen 5020 (see FIG. 6C), the mail address of the login user acquired from the authentication server 107 is set in the "To:" destination 5022. When "Address book" 5024 is pressed, the screen changes to a "To/Cc/Bcc" screen 5040 (see FIG. 7A) (S521). When "Check destination" 5025 is pressed, the screen changes to a "Destination details/editing" screen 5080 (see FIG. 7C) (S523). Destination information set in this process is to be added to the E-mail setting information stored in the storage 114.

In the "Transmission settings" tab 5030 in the "E-mail transmission" screen 5020 (see FIG. 6D), reading settings including the size, orientation, and density of the document to be read by the reading unit 118 of the MFP 101, and E-mail transmission settings including the file name, subject/body text, and reply destination are specified. When "File name" 5031 is pressed, the screen changes to a "File name" screen 5070 (see FIG. 7D) (S524). When "Subject/body text" 5032 is pressed, the screen changes to a "Subject/body text" screen 5060 (see FIG. 7E) (S525). The file name and subject/body text set in this screen are overwritten on the E-mail setting information stored in the storage 114.

A Reading/transmission screen 5090 (see FIG. 6E) is displayed when "Start monochrome scan" 5026 or "Start color scan" 5027 is pressed in the "E-mail transmission" screen 5020. In the Reading/transmission screen 5090, a message "Reading/transmission in progress" 5091 is displayed to indicate that the E-mail transmission is currently being executed.

The MFP 101 reads the document placed on the reading unit 118, converts image data of the read document into an attached file for an E-mail to be transmitted, and performs the E-mail transmission. "Number of destinations" 5092 displays the number of E-mail transmission destinations and the number of pages transmitted. When "Start transmission" 5093 is pressed, the MFP 101 performs the E-mail transmission, and the screen returns to the "E-mail transmission" screen 5020 (S518).

FIGS. 7A to 7E illustrate transitions of screens from the "Destination settings" tab 5021 (see FIG. 6C) and the "Transmission settings" tab 5030 (see FIG. 6D).

A "To/Cc/Bcc" screen 5040 (see FIG. 7A) is used to specify a mail transmission attribute (To/Cc/Bcc) of the transmission destination set from the address book. When "To" 5041 is specified, the mail transmission attribute of the destination is set as a To destination. When "Cc" 5042 is specified, the mail transmission attribute of the destination is set as a Cc destination. When "Bcc" 5043 is specified, the mail transmission attribute of the destination is set as a Bcc destination.

When mail attribute information is set, the screen changes to the address book screen 5050 (see FIG. 7B) (S522). When a mail address set in the address book is selected and pressed, a check mark 5051 is displayed on the pressed mail address. On a not-selected mail address, an uncheck mark 5052 is displayed (or the check mark 5051 may be erased) to indicate that the address is not checked.

When an "Apply" button 5054 is pressed, the checked destination is set to the destination 5022 in the "E-mail transmission" screen 5020 (see FIG. 6C). The "Apply" button 5054 is displayed also in the "File name" screen 5070 (see FIG. 7D) and the "Subject/body text" screen 5060 (see FIG. 7E). When edited data is set and the "Apply" button 5054 is pressed in each screen, the screen returns to the "E-mail transmission" screen 5020.

A "Destination details/editing" screen 5080 (see FIG. 7C) displays the destination information set in the "E-mail transmission" screen 5020 (see FIG. 6C). To deselect the destination specified by a check mark 5081 from the destination information, "Deselect from destination" 5082 is pressed. To edit the destination information, "Edit destination" 5083 is pressed. This enables the user to edit the destination of the mail address by using a keyboard displayed in the "File name" screen 5070 (see FIG. 7D). When "Detailed information" 5084 is pressed, name and mail address information set in the address book is displayed. When "To/Cc/Bcc" 5085 is pressed, the "To/Cc/Bcc" screen 5040 (see FIG. 7A) is displayed, enabling the user to change the specification of the mail transmission attribute "To/Cc/Bcc".

The "File name" screen 5070 (see FIG. 7D) displays a keyboard including a "Kana/Kanji" key 5071 for selecting Japanese characters, an "a" key 5072 for selecting alphabetical characters, and a "1/#" key 5073 for selecting numbers and symbols. This enables the user to edit the file name set in the "Destination settings" tab 5021 in the "E-mail transmission" screen 5020 (see FIG. 6C).

The "Subject/body text" screen 5060 (see FIG. 7E) is a screen for inputting character strings of the subject and body text of an E-mail to be transmitted. When "Subject" 5061 or "Body text" 5062 is pressed, a keyboard is displayed in the "File name" screen 5070 (see FIG. 7D) enabling the user to edit the character strings of "Subject" 5061 and "Body text" 5062.

According to the first exemplary embodiment, as described above, when the reception of the E-mail setting information from the mobile terminal 102 is set to be inhibited, an E-mail transmission (failed) is transmitted as an E-mail transmission response from the MFP 101 to the mobile terminal 102. This enables limiting the E-mail transmission even when a login from a mobile terminal external to the MFP 101 is successful.

Figure 9B:
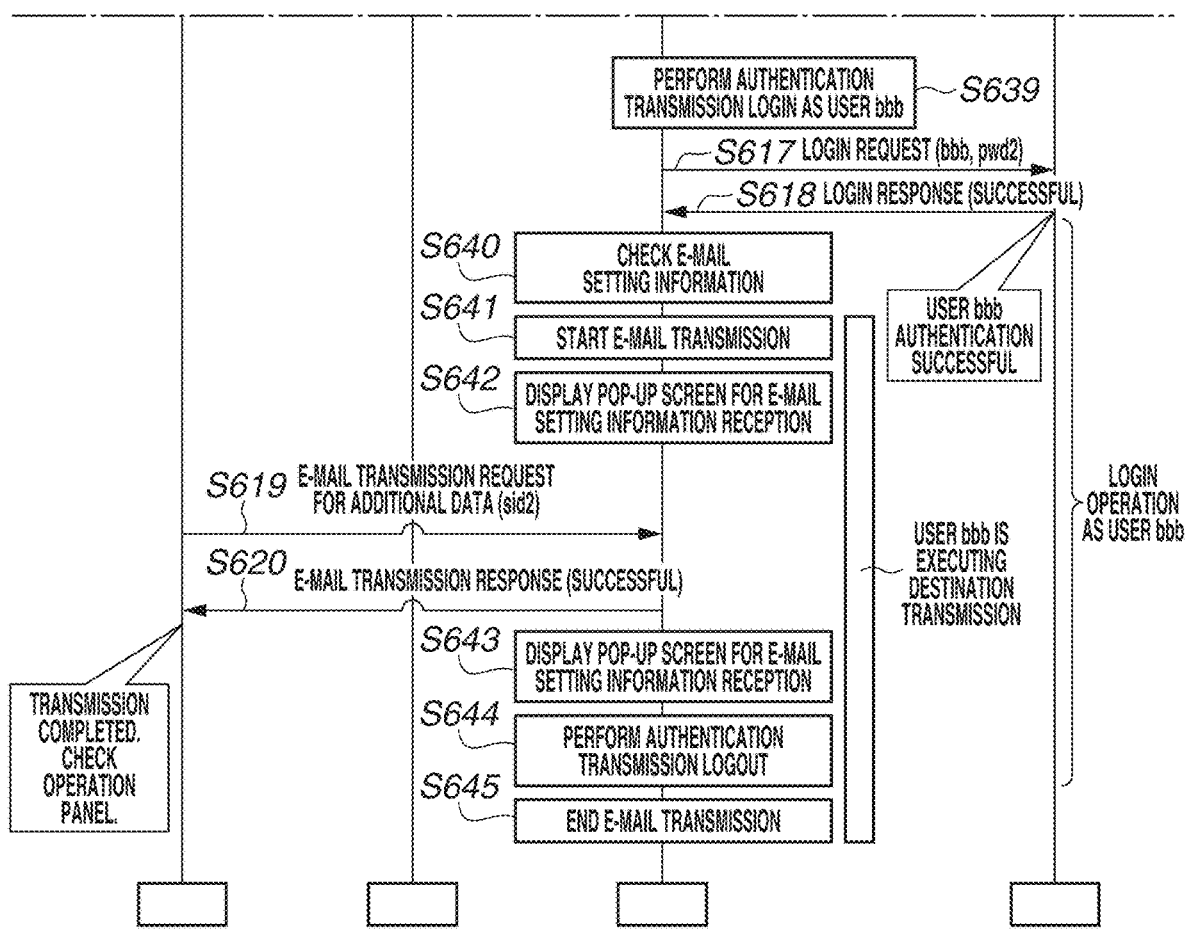
FIG. 9 is a diagram including the flowcharts of FIGS. 9A and 9B illustrating a communication sequence between each mobile terminal and the MFP when a plurality of users attempts an authentication approval.

A second exemplary embodiment will be described below. The second exemplary embodiment will be described below centering on a case where, when a user has already been login-authenticated by the MFP 101, another user issues a login request from the mobile terminal 102. FIG. 9 is a diagram including the flowcharts of FIGS. 9A and 9B illustrating an example of a communication sequence between each of the mobile terminals 102 and 108 and the MFP 101 when user bbb issues a login request from the mobile terminal 108 while user aaa is performing the E-mail transmission after issuing a login request from the mobile terminal 102.

In step S601, user aaa issues a login request to the MFP 101 by using the login information (user name: aaa, password: pwd1, and the authentication server 107) from the mobile terminal 102. At this timing, no user has been login-authenticated by the MFP 101 (S630).

In step S602, the MFP 101 transmits the login information for user aaa (aaa, pwd1) received from the mobile terminal 102 to the authentication server 107 (login request).

In step S603, the authentication server 107 transmits a login response (successful) to the MFP 101 to notify the MFP 101 that the authentication server 107 successfully authenticated user aaa.

In step S604, the MFP 101 requests the authentication server 107 for the mail address and the folder information for user aaa who issued a login request (MFP destination data acquisition request).

In step S605, the MFP 101 receives the mail address of user aaa (aaa@abc.co.jp) and the folder information (a character string like "\\server_name\folder name") from the authentication server 107 (MFP destination data response).

In step S606, the MFP 101 transmits a login response (successful) and the session ID (sid1) of user aaa to the mobile terminal 102 (login response).

In step S607, user aaa transmits the session ID (sid1) and the E-mail setting information (destination, subject, file name, and body text of an E-mail) from the mobile terminal 102 to the MFP 101 (E-mail transmission request).

Upon reception of the E-mail transmission request, the MFP 101 acquires the user information associated with user aaa from the received session ID (sid1) and enters a state for starting the E-mail transmission as user aaa (S631). The MFP 101 enters a login state as user aaa (S632). The MFP 101 displays the pop-up screen 5010 in the "E-mail transmission" screen 5020 (see FIG. 6B) to notify user aaa of the mobile terminal 102 of the reception of the E-mail transmission setting (S633).

In step S608, the MFP 101 transmits an E-mail transmission response (successful) to the mobile terminal 102 to notify the mobile terminal 102 that the E-mail setting information received in the E-mail transmission request (S607) of data has normally been set in the MFP 101 (E-mail transmission response).

Upon reception of the E-mail transmission response (successful), the mobile terminal 102 displays the message 440 "Transmission completed. Check operation panel." (see FIG. 5D).

In step S609, user bbb issues a login request to the MFP 101 by using the login information (user name: bbb, password: pwd2) from another mobile terminal 108 (login request). At this timing, user aaa is executing the E-mail transmission function on the MFP 101.

In step S610, the MFP 101 transmits the login information for user bbb (bbb, pwd2) received from the mobile terminal 108 to the authentication server 107 to attempt an authentication of user bbb (login request).

In step S611, the MFP 101 receives information notifying that the authentication server 107 successfully authenticated user bbb based on the login information (bbb, pwd2) (login response). The processing for acquiring the destination data of user bbb is similar to the processing in steps S604 and S605, redundant descriptions thereof will be omitted.

In step S612, the MFP 101 transmits a login response (successful) and the session ID (sid2) of user bbb to the mobile terminal 108 (login response).

In step S613, user bbb transmits the E-mail setting information (destination, subject, file name, and body text) including the session ID (sid2) from the mobile terminal 108 (E-mail transmission request).

The MFP 101 acquires the user name (bbb) associated with the received session ID (sid2). At this timing, since user aaa is executing the E-mail transmission function on the MFP 101, the MFP 101 stores the E-mail setting information for user bbb in the storage 114 without setting the E-mail setting information for user bbb (S634).

In step S614, the MFP 101 transmits an E-mail transmission response (pending) to the mobile terminal 108 to notify the mobile terminal 108 that the E-mail transmission request (S613) has been received from user bbb but has not yet been set to the E-mail transmission setting (E-mail transmission response).

Upon reception of the E-mail transmission response (pending), the mobile terminal 108 displays the message 460 "Transmission completed. Log in and check transmission response." (see FIG. 5C).

In step S615, user aaa transmits additional E-mail setting information (destination, subject, file name, and body text) including the session ID (sid1) from the mobile terminal 102 (additional data E-mail transmission request).

In step S616, the MFP 101 transmits an E-mail transmission response (successful) to the mobile terminal 102 to notify the mobile terminal 102 that the E-mail transmission function for additional data of user aaa associated with the session ID (sid1) is successful (E-mail transmission response).

Upon reception of the E-mail transmission response (successful), the mobile terminal 102 displays the message 440 "Transmission completed. Check operation panel." (see FIG. 5D).

Upon transmission of the E-mail transmission response (successful) (S616), the MFP 101 displays the pop-up screen 5010 in the "E-mail transmission" screen 5020 (see FIG. 6B) to notify that the MFP 101 has the E-mail setting information (S635).

Subsequently, when user aaa starts the E-mail transmission (S636), the MFP 101 executes the E-mail transmission function by user aaa (S637).

After completion of the E-mail transmission, when user aaa presses "Logout" 5028 in the "E-mail transmission" screen 5020, the MFP 101 performs an authentication transmission logout by user aaa (S638).

Then, user bbb inputs the user information (bbb, pwd2) and a server name (authentication server 107) and then presses a "Login" button 5214 in the "Authentication transmission login" screen 5210 (see FIG. 8C) to issue a login request (S639).

In step S617, the MFP 101 transmits the login information for user bbb (bbb, pwd2) input in the "Authentication transmission login" screen 5210, to the authentication server 107 to perform a login operation for user bbb (login request).

In step S618, the authentication server 107 transmits a login response (successful) to the MFP 101 to notify the MFP 101 that user bbb has normally logged in based on user name bbb and password pwd2 of the login information (login response).

When user bbb successfully performs an authentication transmission login, the MFP 101 checks whether the E-mail setting information (destination, subject, file name, and body text) transmitted from the user name bbb has been stored in the storage 114 (S640).

Then, the MFP 101 sets the E-mail setting information transmitted from user bbb in the E-mail transmission request (S613), in the "E-mail transmission" screen 5020 (S641).

Figure 8C:
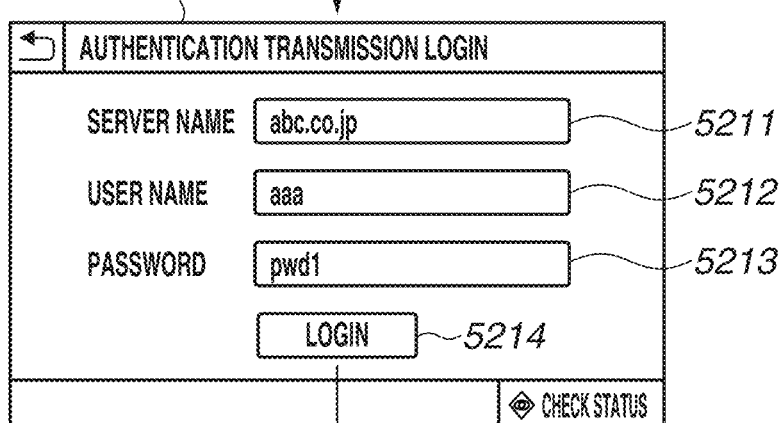
Figure 8D:
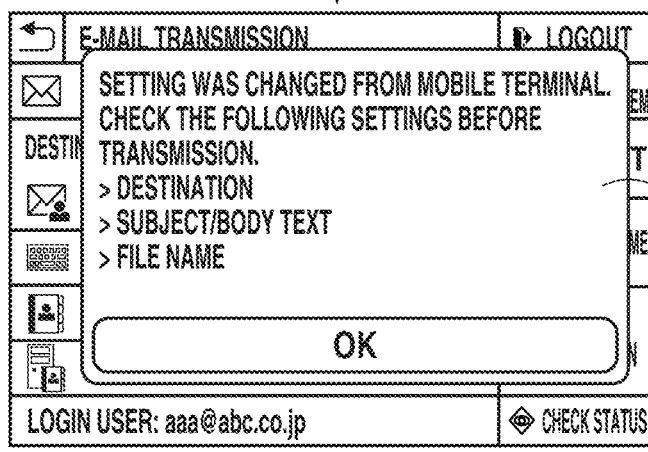

Then, the MFP 101 displays the pop-up screen 5010 in the "E-mail transmission" screen 5020 (see FIG. 8D). When user bbb presses "OK" 5011, the MFP 101 closes the pop-up screen 5010 (S642).

In step S619, user bbb transmits additional E-mail setting information (destination, body text, subject, and file name) and the session ID (sid2) from the mobile terminal 108 to the MFP 101 (additional data E-mail transmission request).

The MFP 101 analyzes the session ID (sid2) transmitted in step S619 to identify user (bbb) associated with sid2, and checks that user bbb is identical to user bbb in the E-mail transmission request.

In step S620, the MFP 101 transmits an E-mail transmission response (successful) to the mobile terminal 108 to notify the mobile terminal 108 that the transmitted additional E-mail setting information has been normally set (E-mail transmission response).

Upon reception of the E-mail transmission response (successful), the mobile terminal 108 displays the message 440 "Transmission completed. Check operation panel." (see FIG. 5D).

The MFP 101 displays the pop-up screen 5010 in the "E-mail transmission" screen 5020 to notify user bbb that the additional E-mail setting information has been set.

When user bbb performs an authentication transmission logout after the E-mail transmission (S644), the MFP 101 completes the E-mail transmission function instructed by user bbb (S645).

In the sequence illustrated in FIG. 9, as described above, when the MFP 101 receives an E-mail transmission request from the mobile terminal 102 in a state where no user is login-authenticated, the MFP 101 subsequently sets the E-mail setting information input upon issuance of a login request.

Thus, by transmitting the E-mail setting information from the mobile terminal 102 without performing the operation in the "Authentication transmission login" screen 5210, the user can immediately perform the E-mail transmission from the "E-mail transmission" screen 5020.

Meanwhile, the MFP 101 stores the E-mail setting information transmitted while another user is executing the E-mail transmission function in the storage 114, without setting the information. After another user ends the E-mail transmission, the MFP 101 displays the "Authentication transmission login" screen 5210. Then, when the user who transmitted the E-mail setting information logs in from the "Authentication transmission login" screen 5210, the MFP 101 sets the stored E-mail setting information.

With the configuration, the user can prepare for the E-mail transmission using the mobile terminal 102 while another user is executing the E-mail transmission function. In addition, since the stored E-mail setting information is set when the user simply logs in from the "Authentication transmission login" screen 5210, the user can immediately perform the E-mail transmission.

Figure 10B:
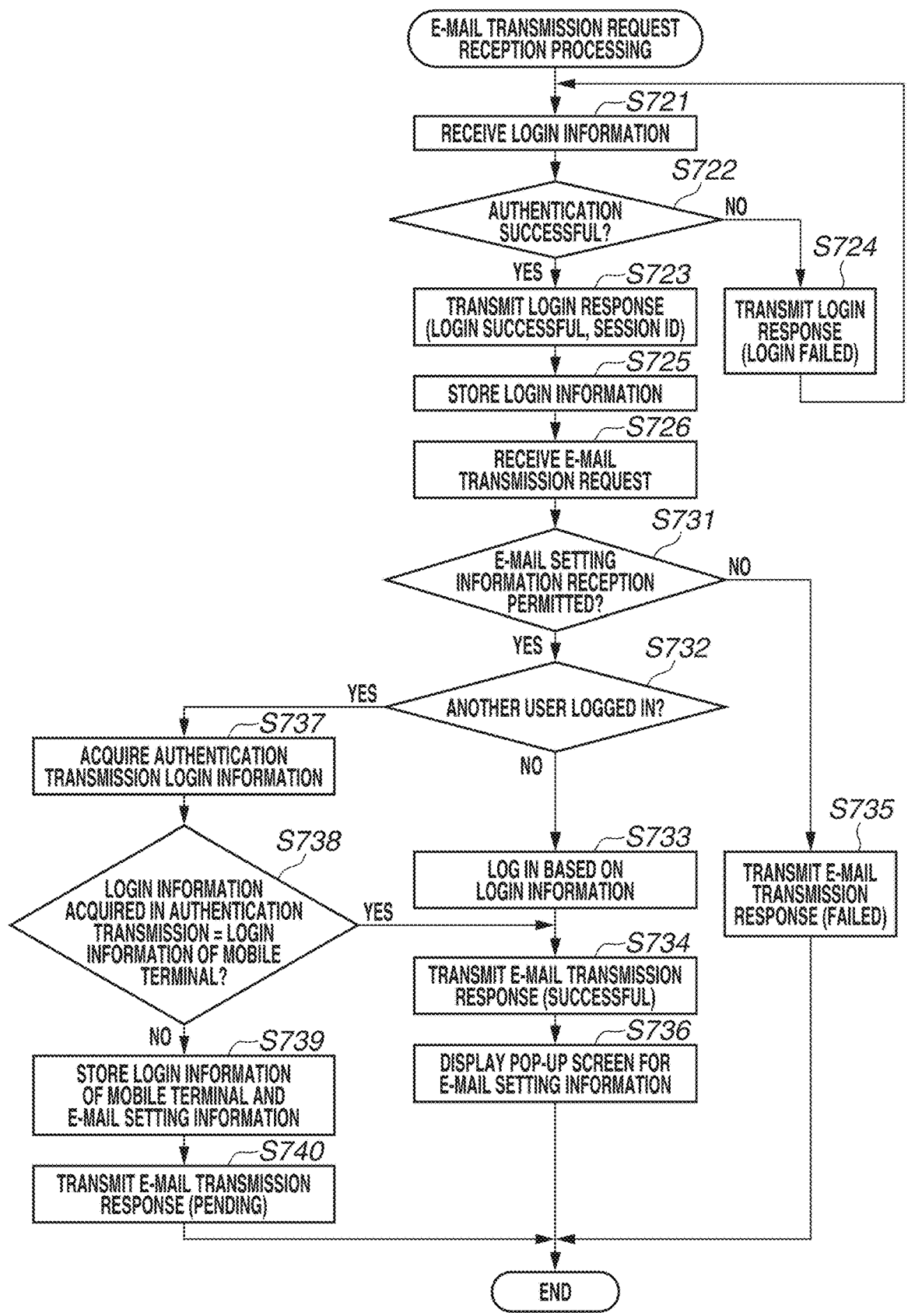
FIG. 10B is a flowchart illustrating processing for receiving an E-mail transmission request according to a second exemplary embodiment.

FIG. 10B is a flowchart illustrating data reception processing (E-mail transmission request reception processing) that is performed by the MFP 101 upon reception of an E-mail transmission request from the mobile terminal 102 according to the second exemplary embodiment.

Steps S721 to S726 are similar to steps S701 to S706 illustrated in FIG. 10A, respectively, and redundant descriptions thereof will be omitted.

In step S731, the MFP 101 determines whether "Permit" is set for "Reception of transmission setting information from mobile terminal" 905. In a case where "Permit" is set (YES in step S731), the processing proceeds to step S732. Meanwhile, in a case where "Do not permit" is set (NO in step S731), the processing proceeds to step S735.

In a case where the MFP 101 determines that "Permit" is set for "Reception of transmission setting information from mobile terminal" 905 (YES in step S731), then in step S732, the MFP 101 determines whether another user has logged in. In a case where another user is logging in (YES in step S732), the processing proceeds to step S737. Meanwhile, when no user has logged in (NO in step S732), the processing proceeds to step S733.

In a case where no user has logged in (NO in step S732), then in step S733, the MFP 101 performs setting based on the login information received from the mobile terminal 102 so that the user has logged into the authentication transmission.

In step S734, the MFP 101 transmits an E-mail transmission response (successful) to the mobile terminal 102 to notify the mobile terminal 102 that the E-mail setting information has been set in the "E-mail transmission" screen 5020.

In step S736, the MFP 101 displays the pop-up screen 5010 in the "E-mail transmission" screen 5020 to notify the user that the MFP 101 has the E-mail setting information received from the mobile terminal 102.

Meanwhile, in a case where the MFP 101 determines that "Do not permit" is set for "Reception of transmission setting information from mobile terminal" 905 (NO in step S731), the processing proceeds to step S735. In this case, since the MFP 101 does not receive the E-mail setting information transmitted from the mobile terminal 102, the user is unable to use the E-mail transmission function of the MFP 101 by using the mobile terminal 102. In step S735, the MFP 101 transmits an E-mail transmission response (failed) to the mobile terminal 102 to notify the mobile terminal 102 that the E-mail setting information has not been set.

In a case where another user is logging in (YES in step S732), then in step S737, the MFP 101 acquires the login information input in the "Authentication transmission login" screen 5210.

In step S738, the MFP 101 compares the login information acquired in step S737 with the login information for the mobile terminal 102 to determine whether the two pieces of login information coincides with each other.

In a case where the two pieces of login information are matched (YES in step S738), the processing proceeds to step S734. In step S734, the MFP 101 performs the above-described processing. Meanwhile, in a case where the two pieces of login information do not coincide with each other (NO in step S738), the processing proceeds to step S739.

In a case where the login information acquired in step S737 and the login information for the mobile terminal 102 do not coincide with each other (NO in step S738), then in step S739, the MFP 101 stores the login information and the E-mail setting information received from the mobile terminal 102 in the storage 114. When the additional data is transmitted, the MFP 101 adds the destination to the last received E-mail setting information and overwrites the body text, subject, and file name thereon, and then stores the information in the storage 114.

In step S740, the MFP 101 transmits an E-mail transmission response (pending) to the mobile terminal 102 to notify the mobile terminal 102 that the E-mail setting information has been stored in the storage 114 and the E-main transmission is in a pending state.

Figure 11:
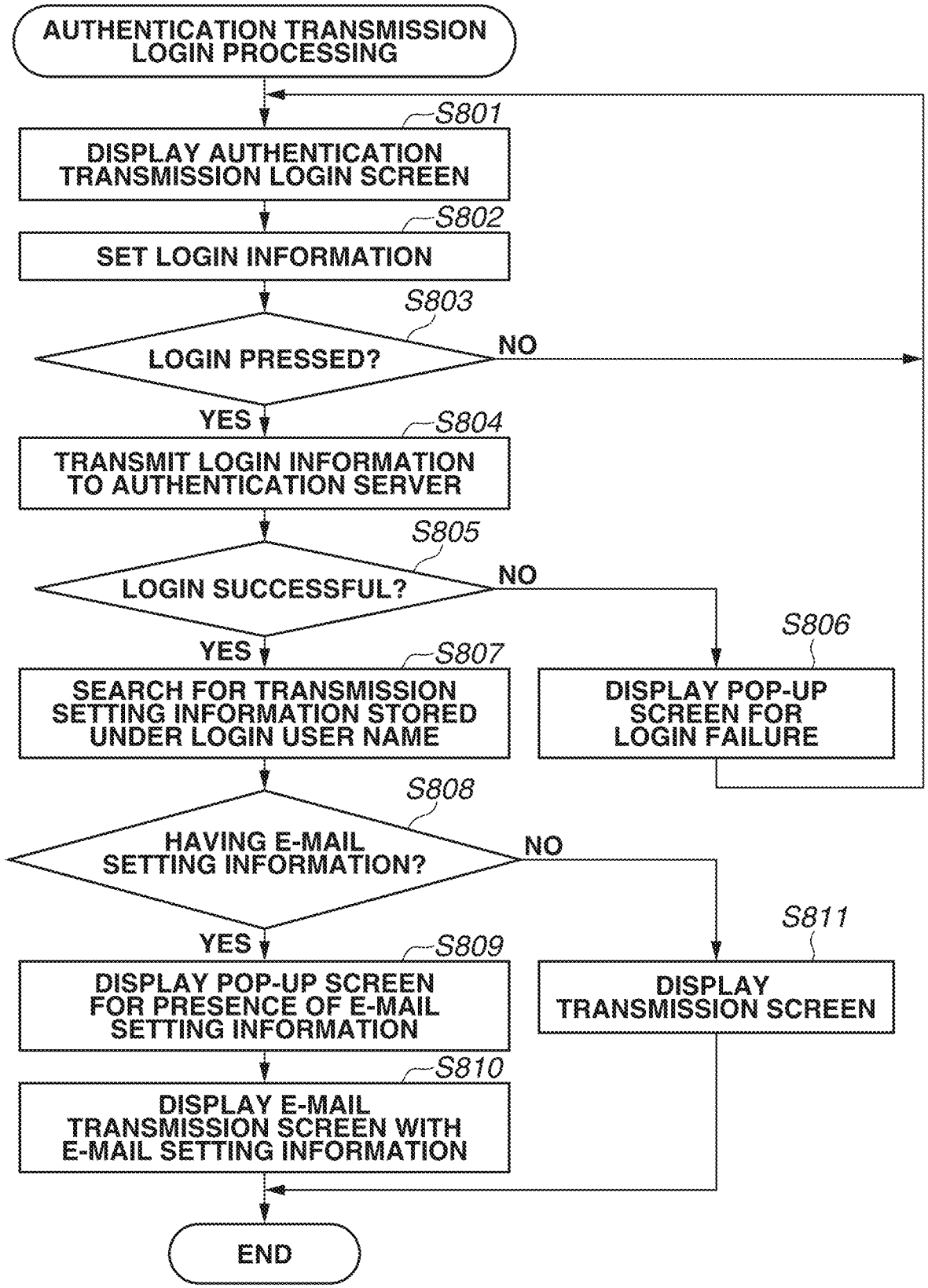
FIG. 11 is a flowchart illustrating authentication transmission login processing performed by the MFP.

FIG. 11 is a flowchart illustrating the authentication transmission login processing performed by the MFP 101 when the login information is input from the "Authentication transmission login" screen 5210 according to the second exemplary embodiment.

In step S801, the MFP 101 displays the "Authentication transmission login" screen 5210 (see FIG. 8C) and receives an input of the login information.

In step S802, the MFP 101 stores "Server name" 5211 (a domain name is also applicable), "User name" 5212, and "Password" 5213 input in the "Authentication transmission login" screen 5210, as login information.

In step S803, the MFP 101 determines whether the "Login" button 5214 is pressed in the "Authentication transmission login" screen 5210.

In a case where the "Login" button 5214 is pressed (YES in step S803), the processing proceeds to step S804. Meanwhile, in a case where the "Login" button 5214 is not pressed (NO in step S803), the processing returns to step S801.

In a case where the "Login" button 5214 is pressed (YES in step S803), then in step S804, the MFP 101 transmits the input login information (user name, password, and server name or domain name) to the authentication server 107. Then, the MFP 101 receives a login response from the authentication server 107.

In step S805, the MFP 101 determines whether login is successful based on the login response received from the authentication server 107 in step S804.

In a case where login is successful (YES in step S805), the processing proceeds to step S807. Meanwhile, in a case where login is failed (NO in step S805), the processing proceeds to step S806.

In step S806, the MFP 101 displays a message "Login failed" in a pop-up screen (not illustrated). When a Close button is pressed, the processing returns to step S801.

In a case where login is successful (YES in step S805), then in step S807, the MFP 101 searches for the E-mail setting information (destination, subject, file name, and body text of an E-mail) stored in the storage 114, more specifically, the E-mail setting information stored under the user name input in the "Authentication transmission login" screen 5210.

In step S808, the MFP 101 determines whether the MFP 101 has the E-mail setting information stored under the same user name as the login user.

In a case where the MFP 101 has the E-mail setting information stored under the same user name as the login user (YES in step S808), the processing proceeds to step S809. Meanwhile, in a case where the MFP 101 does not have the E-mail setting information stored under the same user name as the login user (NO in step S808), the processing proceeds to step S811.

In a case where the MFP has the E-mail setting information stored under the same user name as the login user (YES in step S808), then in step S809, the MFP 101 changes the screen to the "E-mail transmission" screen 5020 (see FIG. 8D). Then, the MFP 101 displays the pop-up screen 5010 to notify the user that the E-mail setting information has been stored. When "OK" 5011 in the pop-up screen 5010 is pressed, the processing proceeds to step S810.

In step S810, the MFP 101 displays the "E-mail transmission" screen 5020 with the E-mail setting information set therein.

Meanwhile, in a case where the MFP does not have the E-mail setting information stored under the same user name as the login user (NO in step S808), then in step S811, the MFP 101 displays the "E-mail transmission" screen 5020 which is the screen to be displayed after execution of the authentication transmission login processing.

FIGS. 8A to 8D illustrate transitions of screens that are displayed on the operation unit 116 of the MFP 101 when a user attempts an E-mail transmission from the mobile terminal 102 while another user is executing the E-mail transmission function on the MFP 101. An example will be described below. In the example, user bbb attempts an E-mail transmission via the mobile terminal 108 while user aaa is performing the E-mail transmission from the MFP 101 via the mobile terminal 102, as illustrated in FIG. 9.

Upon reception of the login information (user name, password, and server name or domain name) and the E-mail setting information (destination, subject, file name, and body text) from the mobile terminal 108 by user bbb, the MFP 101 accesses the authentication server 107 to perform the authentication processing. When authentication is successful, the MFP 101 stores the login information and the E-mail setting information in the storage 114.

In this case, since the MFP 101 has been executing the E-mail transmission function by user aaa, user bbb is unable to execute the E-mail transmission function on the MFP 101. Therefore, the MFP 101 stores the E-mail setting information received from the mobile terminal 108 and, without displaying the "E-mail transmission" screen 5020, transmits an E-mail transmission response (pending) to the mobile terminal 108 to notify the mobile terminal 108 of the pending state of the E-mail transmission. The mobile terminal 108 displays the message 460 "Transmission completed. Log in and check transmission response." (see FIG. 5C) as notification of the E-mail transmission pending state and ends the E-mail transmission request.

"Mobile portal" 5025 in the "Destination settings" tab 5021 in the "E-mail transmission" screen 5020 (see FIG. 8A) is a shortcut button for displaying a mobile portal setting screen (not illustrated). "Mobile portal" 5025 is a button that is displayed when "Mobile terminal=Address book association settings" (not illustrated) is enabled. "Mobile terminal=Address book association settings" is a setting for receiving the transmission setting information from the mobile terminal 102 by using the E-mail transmission function. When this setting is enabled, the E-mail transmission request reception processing illustrated in the flowcharts illustrated in FIGS. 10A to 10C is activated. In the mobile portal setting screen, the MFP 101 can set wireless communication with the mobile terminal 102.

After setting wireless communication with the mobile terminal 108, the screen of the operation unit 116 of the MFP 101 returns to the "E-mail transmission" screen 5020 (from FIG. 6B to FIG. 6D). Then, the MFP 101 performs wireless communication connection with the mobile terminal 108, receives the E-mail setting information from the mobile terminal 108, and then displays the pop-up screen 5010 (see FIG. 6B). Then, the MFP 101 sets the received destination in the "Destination settings" tab 5021 (see FIG. 6C) and sets the received subject, body text, and file name in the "Transmission settings" tab 5030 (see FIG. 6D).

When user aaa logs out and the screen returns to the "Home" screen 305 (see FIG. 8B), user bbb who transmitted the E-mail setting information from the mobile terminal 108 presses the "Scan" button 301 to perform the E-mail transmission. Then, the "Authentication transmission login" screen 5210 (see FIG. 8C) is displayed on the operation unit 116 of the MFP 101.

The "Authentication transmission login" screen 5210 displays a "Server name" text box 5211, a "User name" text box 5212, and a "Password" text box 5213. Then, when the "Login" button 5214 is pressed, the transmission functions (E-mail, File, etc.) which can be activated from the "Scan" button 301 are displayed (not illustrated).

According to the present exemplary embodiment, when the user name input to the "User name" text box 5212 coincides with the user name of the login user stored in the storage 114, the "E-mail transmission" screen 5020 and the pop-up screen 5010 are displayed (see FIG. 8D). Then, the MFP 101 notifies user bbb of the reception of the E-mail setting information from the mobile terminal 108. Subsequent screen transitions are similar to the screen transitions illustrated in FIGS. 6A to 6E, and redundant descriptions thereof will be omitted.

The second exemplary embodiment has been described above centering on a case where, while a user (for example, user aaa) is executing the E-mail transmission function of the MFP 101, another user (for example, user bbb) attempts an E-mail transmission. In this case, the MFP 101 stores the E-mail setting information transmitted from user bbb without setting the E-mail setting information. Then, upon completion of the E-mail transmission by user aaa, the MFP 101 performs the E-mail transmission by user bbb by using the stored E-mail setting information. With this configuration, user bbb can perform the E-mail transmission immediately after completion of the E-mail transmission by user aaa.

A third exemplary embodiment will be described below.

According to the present exemplary embodiment, the MFP 101 selects processing for subsequently setting the E-mail setting information at issuance of a login request or processing for storing the login information and the E-mail setting information at issuance of a login request without setting these pieces of information, depending on a setting in the MFP 101.

Figure 10C:
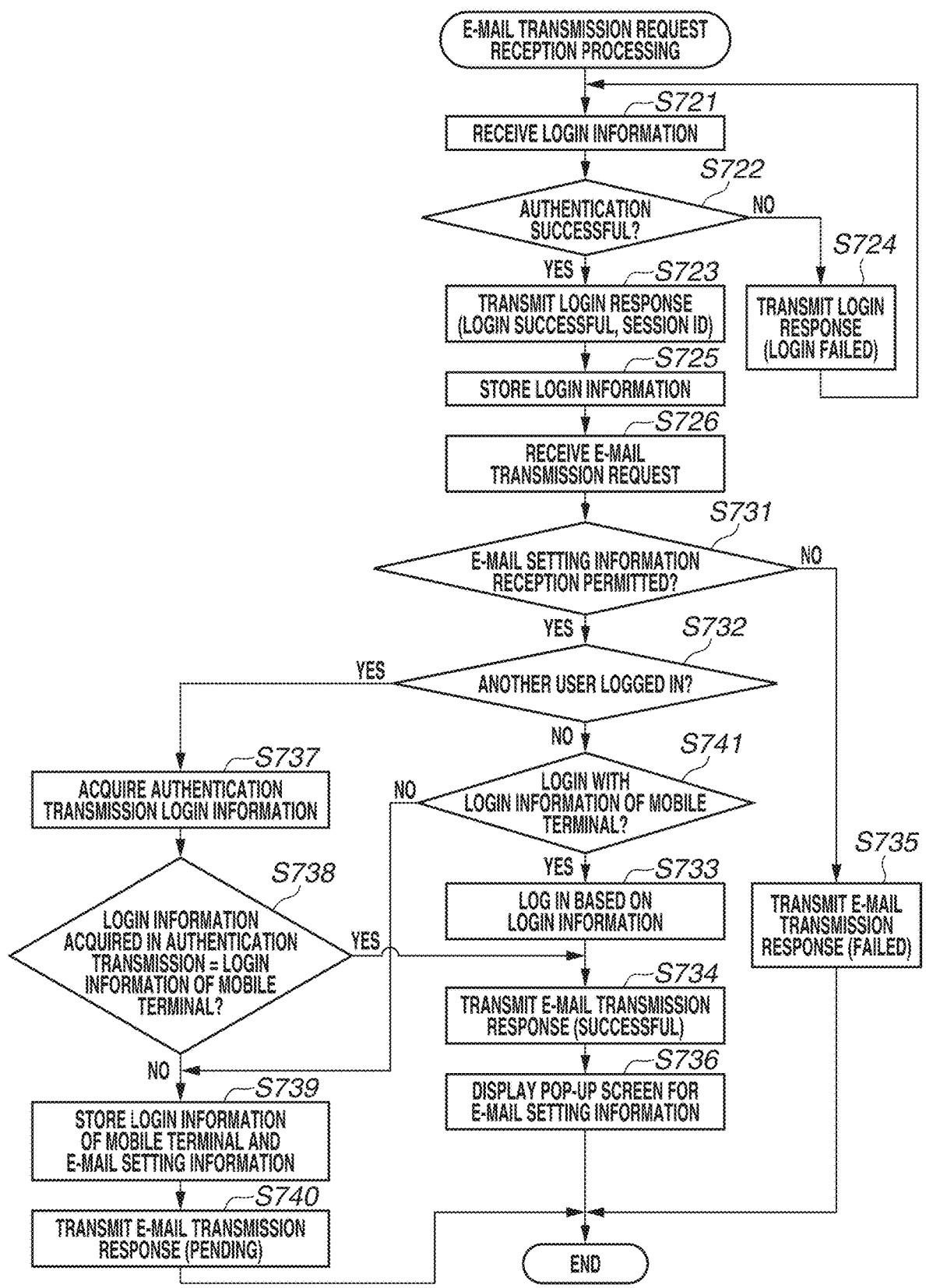
FIG. 10C is a flowchart illustrating processing for receiving an E-mail transmission request according to a third exemplary embodiment.

FIG. 10C is a flowchart illustrating data reception processing (E-mail transmission request reception processing) performed by the MFP 101 upon reception of an E-mail transmission request from the mobile terminal 102 according to the third exemplary embodiment.

Steps S721 to S740 are similar to steps with the same step numbers in the flowchart according to the second exemplary embodiment, and redundant descriptions will be omitted. However, according to the present exemplary embodiment, in a case where another user has logged in (YES in step S732), the processing proceeds to step S737. Meanwhile, in a case where an authentication transmission login is not completed (NO in step S732), the processing proceeds to step S741.

In step S741, the MFP 101 reads the setting of "Login as user upon reception of transmission setting information" 908 from the storage 114.

In a case where "Do not permit" is set for "Login as user upon reception of transmission setting information" 908 (see FIG. 12), the MFP 101 displays the "Authentication transmission login" screen 5210 (see FIG. 8C). Meanwhile, in a case where "Permit" is set, the MFP 101 displays the "E-mail transmission" screen 5020 (see FIG. 8D) without displaying the "Authentication transmission login" screen 5210.

In a case where "Permit" is set for "Login as user upon reception of transmission setting information" 908 (YES in step S741), the processing proceeds to step S733. Meanwhile, in a case where "Do not permit" is set for "Login as user upon reception of transmission setting information" 908 (NO in step S741), the processing proceeds to step S739.

According to the third exemplary embodiment, as described above, the MFP 101 changes whether to subsequently set the login information and the E-mail setting information at issuance of a login request are set, depending on a setting. More specifically, the MFP 101 selects processing for setting the E-mail setting information at issuance of a login request and displaying the "E-mail transmission" screen, or processing for storing the login information and the E-mail setting information at issuance of a login request and suspending the E-mail transmission.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-197203, filed Oct. 19, 2018, which is hereby incorporated by reference herein in its entirety.

What is claimed is:

1. A data transmission apparatus having a transmission function for transmitting image data, the data transmission apparatus comprising:
   a communicator that receives a destination from a mobile terminal; and
   a controller that sets the received destination as a transmission destination of the transmission function,
   wherein the controller sets whether or not an authentication function for authenticating a user to allow the user to use the transmission function by the data transmission apparatus is valid, and
   wherein the controller does not set, based on a setting that the authentication function is valid, the received destination as the transmission destination of the transmission function.

2. The data transmission apparatus according to claim 1, wherein the controller further sets whether to permit a reception of the destination as a setting of the transmission function, and
   wherein, in a case where reception of the destination is set to be permitted, the controller sets the received destination as the transmission destination even when the authentication function is set to be valid.

3. The data transmission apparatus according to claim 2, further comprising:
   a storage stores the destination to be used by the transmission function in association with identification information,
   wherein the communicator receives a destination and identification information from the mobile terminal, and
   wherein, in a case where it is determined that a login user of the data transmission apparatus and a user of the mobile terminal do not coincide with each other based on the received identification information, the storage stores the received destination and identification information corresponding to the user of the mobile terminal in an associated way, without setting the received destination as the transmission destination.

4. The data transmission apparatus according to claim 3:
   wherein the controller determines whether data related to the login user is in the storage after the user logs into the data transmission apparatus to use the transmission function,
   wherein, in a case where the data related to the login user is determined to have been stored in the storage, the controller controls setting of the destination to be used by the transmission function based on the data related to the user.

5. The data transmission apparatus according to claim 1, wherein the controller further sets whether to inhibit the use of the transmission function.

6. The data transmission apparatus according to claim 1, wherein the controller can further set to permit transmission of the data only to a destination associated with a user logging into the data transmission apparatus.

7. The data transmission apparatus according to claim 1, wherein the destination is an E-mail address, and the transmission unit transmits an E-mail to the E-mail address.

8. The data transmission apparatus according to claim 1, further comprising a scanner; and a transmitter,
wherein the transmitter transmits image data based on an image generated by scanning a document by the scanner to the received destination.

9. A method for controlling a data transmission apparatus having a transmission function of transmitting image data, the method comprising:

receiving a destination from a mobile terminal;

setting the received destination as a transmission destination of the transmission function; and setting whether or not an authentication function for authenticating a user to allow the user to use the transmission function by the data transmission apparatus is valid, wherein the received destination is not set, based on a setting that the authentication function is valid, as the transmission destination of the transmission function.

* * * * *